United States Patent
Nakagawa et al.

(10) Patent No.: US 12,134,679 B2
(45) Date of Patent: Nov. 5, 2024

(54) POLYESTER RESIN FOR HEAT-SHRINKABLE FILM, HEAT-SHRINKABLE FILM, HEAT-SHRINKABLE LABEL, AND PACKAGED PRODUCT

(71) Applicant: TOYOBO CO., LTD., Osaka (JP)

(72) Inventors: Satoru Nakagawa, Tsuruga (JP); Kosuke Uotani, Tsuruga (JP); Hideto Ohashi, Tsuruga (JP); Masayuki Haruta, Tsuruga (JP); Shintaro Ishimaru, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 784 days.

(21) Appl. No.: 17/276,120

(22) PCT Filed: Sep. 25, 2019

(86) PCT No.: PCT/JP2019/037548
§ 371 (c)(1),
(2) Date: Mar. 12, 2021

(87) PCT Pub. No.: WO2020/080051
PCT Pub. Date: Apr. 23, 2020

(65) Prior Publication Data
US 2022/0049049 A1 Feb. 17, 2022

(30) Foreign Application Priority Data

Oct. 16, 2018 (JP) ................................. 2018-194894

(51) Int. Cl.
| | | |
|---|---|---|
| C08G 63/197 | (2006.01) | |
| B29C 61/02 | (2006.01) | |
| C08J 5/18 | (2006.01) | |
| G09F 3/00 | (2006.01) | |
| G09F 3/04 | (2006.01) | |
| B29K 67/00 | (2006.01) | |
| B29K 105/00 | (2006.01) | |
| B29L 31/00 | (2006.01) | |

(52) U.S. Cl.
CPC .............. *C08G 63/197* (2013.01); *C08J 5/18* (2013.01); *G09F 3/0291* (2013.01); *G09F 3/04* (2013.01); *B29C 61/02* (2013.01); *B29K 2067/003* (2013.01); *B29K 2105/0085* (2013.01); *B29L 2031/744* (2013.01); *C08J 2367/02* (2013.01)

(58) Field of Classification Search
CPC ....... C08J 5/18; B32B 27/36; B32B 2307/736
USPC ............................................ 428/34.1–36.92
See application file for complete search history.

(56) References Cited

U.S. PATENT DOCUMENTS

| | | | | |
|---|---|---|---|---|
| 5,340,624 | A * | 8/1994 | Sublett ....................... | C08J 5/18 528/307 |
| 6,599,994 | B2 * | 7/2003 | Shelby .................... | C08L 67/02 428/35.1 |
| 7,829,655 | B2 | 11/2010 | Endo et al. | |
| 8,568,841 | B2 * | 10/2013 | Kim ......................... | C08J 5/18 528/308.1 |
| 2004/0236063 | A1 * | 11/2004 | Suzuki ...................... | C08J 3/12 528/308 |
| 2007/0224377 | A1 * | 9/2007 | Leimbacher ............ | C08L 67/02 264/310 |
| 2009/0297752 | A1 * | 12/2009 | Togawa .................. | B32B 27/08 428/36.92 |
| 2013/0115402 | A1 * | 5/2013 | Tammaji ................. | C08L 67/02 523/400 |
| 2016/0237207 | A1 | 8/2016 | Ohashi et al. | |
| 2018/0265627 | A1 * | 9/2018 | Ohashi .................... | C09J 167/02 |
| 2019/0211167 | A1 * | 7/2019 | Peters ..................... | C08G 63/16 |
| 2019/0375552 | A1 | 12/2019 | Haruta et al. | |
| 2020/0062954 | A1 * | 2/2020 | Lim ......................... | C08J 7/043 |
| 2021/0108027 | A1 * | 4/2021 | Minami ............... | C08G 63/183 |

FOREIGN PATENT DOCUMENTS

| | | |
|---|---|---|
| EP | 3617247 A1 | 3/2020 |
| JP | H04-164930 A | 6/1992 |
| JP | H05-033895 B2 | 5/1993 |
| JP | H07-053737 A | 2/1995 |

(Continued)

OTHER PUBLICATIONS

Japanese Patent Office, International Search Report in International Patent Application No. PCT/JP2019/037548 (Dec. 10, 2019).
Japanese Patent Office, International Preliminary Report on Patentability in International Patent Application No. PCT/JP2019/037548 (Apr. 14, 2021).
European Patent Office, Extended European Search Report in European Patent Application No. 19872609.3 (May 25, 2022).

*Primary Examiner* — Michael C Romanowski
(74) *Attorney, Agent, or Firm* — Leydig, Voit & Mayer, Ltd.

(57) ABSTRACT

The invention provides a polyester resin for heat-shrinkable film which contains terephthalic acid as a main component of a dicarboxylic acid component, contains ethylene glycol as a main component of a diol component, and contains from 18 to 32% by mole of neopentyl glycol and from 7 to 15% by mole of diethylene glycol when a total amount of the whole diol component in total polyester resin components is taken as 100% by mole. The polyester resin has (i) an intrinsic viscosity (IV) of not less than 0.65 and less than 0.70 dl/g, (ii) a carboxyl end group concentration (AV) of 8-25 eq/t, (iii) a color b value of 1.0-8.0 in an L*a*b* color system, and (iv) aluminum and phosphorus atoms, wherein the aluminum atoms are present in an amount of 15-40 ppm, and wherein the molar ratio of the phosphorus atoms to the aluminum atoms is 1.8-2.6.

4 Claims, No Drawings

(56) References Cited

FOREIGN PATENT DOCUMENTS

| | | | |
|---|---|---|---|
| JP | 2006-206860 A | 8/2006 | |
| JP | 4411556 B2 | 2/2010 | |
| JP | 5249997 B2 | 7/2013 | |
| JP | 2016-117178 A | 6/2016 | |
| WO | WO-2007013618 * | 2/2007 | ............... G09F 3/04 |
| WO | WO 2008/010503 A1 | 1/2008 | |
| WO | WO-2013125454 A1 * | 8/2013 | ........... C08G 63/185 |
| WO | WO 2015/060335 A1 | 4/2015 | |
| WO | WO-2016125829 A1 * | 8/2016 | ............. C08G 63/16 |
| WO | WO 2018/147249 A1 | 8/2018 | |
| WO | WO 2018/198845 A1 | 11/2018 | |

* cited by examiner

POLYESTER RESIN FOR HEAT-SHRINKABLE FILM, HEAT-SHRINKABLE FILM, HEAT-SHRINKABLE LABEL, AND PACKAGED PRODUCT

CROSS-REFERENCE TO RELATED APPLICATIONS

This patent application is the U.S. national phase of International Patent Application No. PCT/JP2019/037548, filed on Sep. 25, 2019, which claims the benefit of Japanese Patent Application No. 2018-194894, filed on Oct. 16, 2018, which are incorporated by reference in their entireties herein.

TECHNICAL FIELD OF THE INVENTION

The present invention relates to a heat-shrinkable polyester resin which is suitable for a use as a heat-shrinkable label and which is excellent in the recycling property, and also relates to a heat-shrinkable film, a heat-shrinkable label and a packaged product using the same.

BACKGROUND ART

In a use as a label package, a cap seal, an assembling packaging, etc. acting both as a protector of glass bottles, plastic bottles or the like and as an indicator of products, a heat-shrinkable polyester-based film which exhibits high heat resistance, easy burning, and excellent solvent resistance has been widely used as a shrinking label in recent years. A use amount thereof tends to increase as a result of an increase in PET (polyethylene terephthalate) bottle containers, etc.

As a heat-shrinkable polyester-based film, a film which greatly shrinks in a widthwise direction has been widely utilized up to now. In addition, in order to make a finish after shrinking better, a film wherein a shrinking rate in a lengthwise direction which is a non-shrinking direction is adjusted to be minus (i.e., a film which stretches by heating) has been also known (see Patent Document 1).

In the heat-shrinkable polyester-based film, it has been proposed to adjust the shrinking rate to be high in order to deal with various containers (see Patent Documents 2 and 3). However, in such film having high shrinking rate, there are problems that a natural shrinking rate after being stored at an ordinary temperature (after an aging) becomes high, and that a heat-shrinking rate in hot water measured at 70° C. lowers. In Patent Document 2, the natural shrinking rate is improved by adopting a production method wherein the film is subjected to a biaxial stretch, and to a strengthening of cooling after a biaxial orientation and a longitudinal stretch. However, there is no consideration in Patent Document 2 on the heat-shrinking rates in hot water measured at 70° C. before and after the aging. In Patent Document 3, although the natural shrinking rate has been improved, technical findings concerning the improvement in the natural shrinking rate are not disclosed. In addition, values of the shrinking rates at 70° C. before and after the aging are not considered. When a decrease in the shrinking rate at 70° C. is large, initial shrinking rates in conducting the shrinking are different before and after the aging whereby there is resulted a problem that a finish after shrinking becomes bad. Particularly, in a shrinking apparatus using a hot air having low heat transfer coefficient, there are resulted problems of an insufficient shrinking and a distortion of labels upon finishing if the initial shrinking rates by hot air are different before and after the aging.

In order to solve these problems, there is proposed a copolymerized polyester raw material for film containing terephthalic acid as a main component of a dicarboxylic acid component, containing ethylene glycol as a main component of a diol component, and containing specific amounts of neopentyl glycol and diethylene glycol, wherein intrinsic viscosity and melt viscosity of the material are set to be within specific ranges (see Patent Document 4). Although this copolymerized polyester raw material can reduce the problems of the natural shrinking rate during film preparation and the heat-shrinking rate in hot water measured at 70° C., a decomposition reaction is apt to take place as compared with PET and heat resistance is bad whereby there is yet some room for improvement in a recycling property therein.

In order to solve the problem of Patent Document 4, the applicant has found that, in the copolymerized polyester resin comprising the specific composition containing ethylene glycol as the main component of the diol component, and containing specific amounts of neopentyl glycol and diethylene glycol, a polyester resin for heat-shrinkable film being excellent in both film property and recycling property can be obtained not only by increasing the intrinsic viscosity but also by setting carboxyl end group concentration and color b value within specific ranges (see Patent Document 5).

However, such high intrinsic viscosity of the resin proposed in Patent Document 5 causes another problem. That is, it is not possible to increase a back pressure upon extrusion of the resin so as to increase a film-preparation speed. As a result, it is impossible to reduce a film production cost. When the intrinsic viscosity of the resin is merely lowered for solving the above problem, the resin is deteriorated by heating of the resin upon the film preparation because of low stability of the resin against heat and against thermal oxidation whereby the intrinsic viscosity is greatly lowered upon the film preparation. As a result, the intrinsic viscosity of the resulting film is also greatly lowered. Accordingly, there are such problems that a drawdown happens during the film preparation which prevents the film preparation and that the film strength becomes weak. Accordingly, it has been difficult in the art of Patent Document 5 to achieve both of reducing the film production cost and of securing the film-preparation property and the film strength.

PRIOR ART DOCUMENTS

Patent Documents

Patent Document 1: Japanese Patent Pregrant Publication (JP-B) No. 33895/93
Patent Document 2: Japanese Patent No. 4411556
Patent Document 3: Japanese Patent No. 5249997
Patent Document 4: Japanese Patent Application No. 2017-024183
Patent Document 5: PCT/JP2018/015652

DISCLOSURE OF THE INVENTION

Problem that the Invention is to Solve

The present invention has been done for solving the problems as such in the prior art. The object of the present invention is to provide a polyester resin for heat-shrinkable film which can give film characteristics being suitable for a use as a heat-shrinkable label (i.e. a film which exhibits a high heat-shrinking rate in a main shrinking direction, and which exhibits a small natural shrinking rate and small changes in the shrinking rate even if the film is subjected to an aging treatment) and which is excellent in the recycling property, and also to provide a heat-shrinkable film, a heat-shrinkable label and a packaged product using the same. Also, the object of the present invention is to solve the problems of Patent Document 5 so as to achieve both of reducing the film production cost and of securing the film-preparation property and the film strength.

Means for Solving the Problem

In order to achieve such objects, the inventors have conducted extensive investigations about the means particularly for solving the problems of Patent Document 5. Thus, the inventors firstly investigated the reason for the great lowering of the intrinsic viscosity of the film when the intrinsic viscosity of the resin is merely lowered for increasing the film-preparation speed. Then, the inventors reached an idea that, because of the low stability of the resin against heat and thermal oxidation in the invention of Patent Document 5, the resin is deteriorated by heating of the resin upon the film preparation whereby the intrinsic viscosity of the film is greatly lowered. After that, the inventors reached an idea of changing a type of catalyst used for polymerization of the resin in order to enhance the stability against heat and thermal oxidation of the resin. And the inventors have found that, when a combination of aluminum compound and phosphorus compound is used instead of an antimony compound used as the polymerization catalyst in Patent Document 5, the stability of the resin against heat and thermal oxidation can be enhanced and, further, such combination is also excellent in terms of an activity as the polymerization catalyst. Accordingly, the inventors have found that the intrinsic viscosity of the resulting film is not greatly lowered even if the intrinsic viscosity of the resin is lowered for making the film-preparation speed high and, as a result, that the film-production cost can be reduced without causing any problem in the film-preparation property and the film strength.

The present invention has been achieved on the basis of the above findings and has the constituent features of the following (1) to (4).

(1) A polyester resin for heat-shrinkable film which contains terephthalic acid as a main component of a dicarboxylic acid component, contains ethylene glycol as a main component of a diol component, and contains from 18 to 32% by mole of neopentyl glycol and from 7 to 15% by mole of diethylene glycol when a total amount of the whole diol component in total polyester resin components is taken as 100% by mole, characterized in that the polyester resin satisfies the following requirements (i) to (iv):

(i) The polyester resin has an intrinsic viscosity (IV) of not less than 0.65 and less than 0.70 dl/g;
(ii) The polyester resin has a carboxyl end group concentration (AV) of from 8 to 25 eq/t;
(iii) The polyester resin has a color b value of from 1.0 to 8.0 in an L*a*b* color system; and
(iv) The polyester resin contains aluminum atom and phosphorus atom, wherein an amount of the aluminum phosphorus atom in the polyester resin is 15 to 40 ppm and wherein a molar ratio of the phosphorus atom to the aluminum atom in the polyester resin is 1.8 to 2.6.

(2) A heat-shrinkable film, characterized in that, it contains the polyester resin for heat-shrinkable film mentioned in (1).

(3) A heat-shrinkable label which is characterized in being prepared by using the heat-shrinkable film mentioned in (2).

(4) A packaged product which is characterized in being formed by coating the heat-shrinkable label mentioned in (3) at least on a part of an outer periphery of a target to be packaged followed by subjecting to a heat-shrinking treatment.

Advantages of the Invention

In the polyester resin for heat-shrinkable film according to the present invention, a polyester resin consisting of a specific composition is used and the intrinsic viscosity and the carboxyl end group concentration are controlled to be within specific ranges. In addition, a combination of aluminum compound and phosphorus compound is used instead of an antimony compound used as the polymerization catalyst, and the aluminum compound and the phosphorus compound are used in a specific ratio. Accordingly, the intrinsic viscosity of the resulting film is not greatly lowered even if the intrinsic viscosity of the resin is lowered for making the film-preparation speed high and, as a result, that the film-production cost can be reduced while ensuring the film-preparation property and the film strength.

Also, a packaged product which is packaged with a label prepared from the heat-shrinkable film of the present invention can exhibit a beautiful appearance.

BEST MODE FOR CARRYING OUT THE INVENTION

Hereinafter, the heat-shrinkable film of the present invention and the polyester resin used therefor will be described in detail. As will be mentioned in detail later, a heat-shrinkable film is usually prepared by conveying and stretching a film by using a roll or the like. At that time, a conveying direction of the film is called a lengthwise direction and an orthogonal direction to the above lengthwise direction is called a widthwise direction of the film. Accordingly, the widthwise direction of the heat-shrinkable film shown below is a direction which is vertical to an unwinding direction of the roll while the lengthwise direction of the film is a direction which is parallel to the unwinding direction the roll.

One of the means for preparing a more highly-shrinkable film is a means to increase an amount of a monomer component constituting the unit which can become an amorphous component in the film (hereinafter, it will be referred to just as an amorphous component). In a film prepared by a conventional transversely uniaxial stretch method, when the amount of the amorphous component is increased, the shrinking rate increases proportionally thereto. However, when the amount of the amorphous component is simply increased, it has been found that, although the high shrinking is possible thereby, there are resulted disadvantages such as that the natural shrinking rate increases and the shrinking rate measured at a low temperature of about 70° C. lowers after the aging. It has been also found that, when the amount of the amorphous component is increased, an unevenness in the thickness becomes worse and an appearance of the film product roll is deteriorated. Under such circumstances, the inventors have paid their attention to diethylene glycol (hereinafter, it will be also referred to just as "DEG").

When an amount of diethylene glycol increases, heat resistance becomes bad and discharge of foreign matters increases in a melt extrusion. Therefore, diethylene glycol has not been positively used up to now. However, the present inventors found that, when diethylene glycol is used as a constituent unit of a polyester resin, stretching stress during stretch of a film lowers and, in addition, a decrease in the shrinking rate after the aging being measured at a low temperature of about 70° C. can be suppressed.

The polyester resin for heat-shrinkable film according to the present invention contains an ethylene terephthalate unit as a main component. To be more specific, in all of the resin components, terephthalic acid is used as a main component of a dicarboxylic acid component and ethylene glycol is used as a main component of a diol component. Hereinabove, the "main component" in the dicarboxylic acid component or in the diol component means that it occupies 50% by mole or more in each of the components. Preferably, it occupies 60% by mole or more, and more preferably, it occupies to be 70% by mole or more.

As to other dicarboxylic acid components constituting the polyester resin of the present invention other than terephthalic acid, there are exemplified an aromatic dicarboxylic acid such as isophthalic acid, orthophthalic acid and 2,6-naphthalene dicarboxylic acid, an aliphatic dicarboxylic acid such as adipic acid, azelaic acid, sebacic acid and decanedicarboxylic acid and an alicyclic dicarboxylic acid such as 1,4-cyclohexanedicarboxylic acid. In the present invention, it is preferred that no dicarboxylic acid component other than terephthalic acid is contained therein.

Hereunder, an interpretation for a phrase "can become an amorphous component" mentioned above will be mentioned in detail. An "amorphous polymer" specifically stands for a polymer which does not show endothermic peak by melting in a measurement using a DSC (differential scanning colorimeter). In the amorphous polymer, crystallization does not substantially proceed. Accordingly, the amorphous polymer cannot assume a crystalline state or, even if crystallized, its degree of crystallization is very low. A "crystalline polymer" stands for a polymer which is not the above "amorphous polymer". That is, the "crystalline polymer" stands for a polymer which shows endothermic peak by melting in the measurement using a DSC (differential scanning colorimeter). The crystalline polymer is such a one which can be crystallized when the polymer is heated, or which can become crystallized, or is crystallized already.

Generally speaking, when a polymer being in such a state wherein many monomer units are bonded satisfies various conditions such as that stereoregularity of the polymer is low, symmetry of the polymer is bad, side chain of the polymer is big, branching of the polymer is abundant, or intermolecular cohesive force among polymers is small, it becomes an amorphous polymer. However, depending upon an existing state, there may be a case wherein crystallization well proceeds to result in a crystalline polymer. For example, even if a polymer has a big side chain, when the polymer is constituted from a single monomer unit, there may be a case wherein crystallization well proceeds to result in a crystalline polymer. Therefore, even if a polymer is resulted from the same monomer unit, the polymer may become crystalline or amorphous. Accordingly, in the above description, an expression "a unit derived from a monomer which can become an amorphous component" is used.

Here, an expression "a monomer unit" used in the present invention stands for a repeating unit constituting a polymer, which unit is derived from one polyhydric alcohol molecule and one polycarboxylic acid molecule.

When a monomer unit (an ethylene terephthalate unit) consisting of terephthalic acid and ethylene glycol is a main monomer unit constituting a polymer, there are exemplified a monomer unit consisting of isophthalic acid and ethylene glycol, a monomer unit consisting of terephthalic acid and neopentyl glycol, a monomer unit consisting of terephthalic acid and 1,4-cyclohexanedimethanol and a monomer unit consisting of isophthalic acid and butanediol, as the above unit derived from the monomer which can become the amorphous component.

It is preferred that monocarboxylic acid (such as benzoic acid, lactic acid and glycolic acid) as well as tricarboxylic and higher polycarboxylic acid (such as trimellitic acid, pyromellitic acid and anhydride thereof) are not contained in the polyester. In a heat-shrinkable film prepared by using the polyester containing such monocarboxylic acid or polycarboxylic acid, it is difficult to achieve necessary high shrinking rate.

As to a diol component other than the ethylene glycol constituting the polyester of the present invention, there are exemplified an aliphatic diol such as 1,3-propanediol, 2,2-diethyl-1,3-propanediol, 2-n-butyl-2-ethyl-1,3-propanediol, 2,2-isopropyl-1,3-propanediol, 2,2-di-n-butyl-1,3-propanediol, 1,4-butanediol, hexanediol, neopentyl glycol, diethylene glycol and hexanediol, an alicyclic diol such as 1,4-cyclohexanedimethanol and an aromatic diol such as bisphenol A.

It is necessary that the polyester resin for heat-shrinkable film according to the present invention contains neopentyl glycol as a diol component. A content of neopentyl glycol is 18% by mole or more, preferably 19% by mole or more, and more preferably 20% by mole or more when the total amount of the whole diol component is taken as 100% by mole. The content of neopentyl glycol is 32% by mole or less, preferably 30% by mole or less, more preferably 29% by mole or less, and further preferably 28% by mole or less when the total amount of the whole diol component is taken as 100% by mole. Due to its branched structure, neopentyl glycol has a role of lowering the stereoregularity of polymer and enhancing the amorphous property thereof. Particularly when the content of neopentyl glycol is increased, there is such a tendency that the shrinking rate increases. When the content of neopentyl glycol is less than the above range, amorphous component is insufficient whereby the aimed shrinking rate is not achieved while, when the content is more than that, although the aimed shrinking rate can be achieved, the shrinking rate after aging is deteriorated, the shrinking rate at low temperature (70° C.) is deteriorated or the heat resistance is significantly deteriorated.

It is necessary that the polyester resin for heat-shrinkable film according to the present invention contains diethylene glycol as a diol component. A content of diethylene glycol is 7% by mole or more, preferably 8% by mole or more, and more preferably 9% by mole or more when the total amount of the whole diol component is taken as 100% by mole. The content of diethylene glycol is 15% by mole or less, preferably 14% by mole or less, and more preferably 13% by mole or less when the total amount of the whole diol component is taken as 100% by mole. Due to its long-chain hydrocarbon structure, diethylene glycol has a role of imparting flexibility to polymers. As a result of combining diethylene glycol with neopentyl glycol, the stretching stress during stretch of the film lowers whereby deterioration of the shrinking rate at low temperature (70° C.) is suppressed and deterioration of the shrinking rate after aging is also suppressed. When the content of diethylene glycol is less than the above range, the above-mentioned improving effect is small and the aimed quality is not achieved while, when it is more than the above range, no more improving effect is achieved and there are resulted such problems that the heat resistance is significantly deteriorated and that the yellowish tint of the film becomes strong.

It is preferred that the polyester resin does not contain a diol having not less than 8 carbons (such as octanediol) or a monohydric alcohol (such as hydroxy benzoic acid and benzyl alcohol) or a trihydric or higher polyhydric alcohol (such as trimethylolpropane, trimethylolethane, glycerol or diglycerol). In a heat-shrinkable film prepared by using the polyester resin containing such diol or alcohol, it is difficult to achieve necessary high shrinking rate. It is preferred that the polyester resin does not contain triethylene glycol and polyethylene glycol if at all possible. In the polyester resin of the present invention, the amorphous component in 100% by mole of the polyhydric alcohol component and in 100% by mole of the polycarboxylic acid component (i.e., in 200% by mole in total) in the total polyester resin is preferred to be copolymerized. As a result of the copolymerization, there is no anxiety of segregation of raw materials, and it is possible to prevent a change in physical properties of the film due to variations in compositions of the film raw material. Moreover, as a result of the copolymerization, an ester interchange proceeds whereby the amount of amorphous component increases. Accordingly, it is advantageous for increasing the shrinking rate in the main shrinking direction.

If necessary, various additives such as wax, antioxidant, antistatic agent, crystal nucleus agent, viscosity-reducing agent, heat stabilizer, pigment for coloration, coloration preventer or ultraviolet absorber may be added to the polyester resin for heat-shrinkable film of the present invention.

It is preferred that fine particles which make a working property (slipping property) of the film better are added as a lubricant to the polyester resin for heat-shrinkable film of the present invention. Although anything may be selected as the fine particles, examples of the inorganic fine particles include silica, alumina, titanium dioxide, calcium carbonate, kaolin and barium sulfate while examples of the organic fine particles include acrylic resin particles, melamine resin particles, silicone resin particles and cross-linking polystyrene particles. An average particle size of the fine particles may be appropriately selected upon necessity from a range of 0.05 to 3.0 μm (in case of being measured using a Coulter counter). For example, when the fine particles are silica, it is possible to adjust the average particle size of the fine particles to the above range in case a content thereof is 50 ppm to 3000 ppm. The content of silica is preferred to be 200 ppm or more, and more preferred to be 300 ppm or more. When the content of silica is too much, transparency is deteriorated. Therefore, in a film which requires transparency, the content of silica is preferred to be 2000 ppm or less and more preferred to be 1500 ppm or less.

As to a method of compounding the above particles with the polyester resin for heat-shrinkable film, although it is possible, for example, to add them in any of stages of producing the polyester resin, it is preferred that the particles are added as a slurry being dispersed in ethylene glycol or the like in a stage of esterification or in a stage after completion of ester interchange and before starting polycondensation reaction followed by proceeding the polycondensation. It is also preferred to conduct it, for example, by a method wherein a slurry of the particles dispersed in ethylene glycol, water or the like is blended with the polyester resin raw materials by using a kneading extruder equipped with a vent or by a method wherein the dried particles and the polyester resin raw materials are blended by using a kneading extruder.

It is also possible that the heat-shrinkable film of the present invention is subjected to a corona treatment, a coating treatment or a flame treatment for improving adhesive property of the film surface.

Now, characteristic properties of the polyester resin and of the heat-shrinkable film according to the present invention will be described.

It is necessary that the polyester resin according to the present invention has an intrinsic viscosity (IV) of not less than 0.65 and less than 0.70 dl/g, and preferably from 0.65 to 0.69 dl/g. By adopting such low range of the intrinsic viscosity compared with the conventional resin, it is now possible to increase the film-preparation speed, and as a result, to reduce the film production cost. When the intrinsic viscosity (IV) of the polyester resin is less than the above range, the intrinsic viscosity of the resulting film becomes too low whereby a drawdown during the film preparation becomes large and the film preparation itself becomes difficult. In addition, strength of the resulting film becomes weak and the aimed quality cannot be achieved.

In addition, it is necessary that the carboxyl end group concentration (AV) of the polyester resin of the present invention is from 8 to 25 eq/t, preferably from 9 to 25 eq/t, and more preferably from 9 to 20 eq/t. When the polyester resin of the present invention is extruded at a temperature of as high as not lower than 200° C., deterioration reactions such as hydrolysis, thermal decomposition and oxidative decomposition proceed resulting in a lowering in a polymerization degree, a decrease in a weight, a worsening of a color tone, etc. Particularly, a moisture (including a trace of moisture being contained in the polyester resin after drying, and a trace of moisture with which the polyester resin contacts in the film preparation step and the material-recycling step) advances the hydrolysis using a proton of the carboxyl end group concentration (AV) of the polyester resin as a catalyst, and advances the decomposition in more significant velocity than in other deterioration reactions. Therefore, it is necessary that the carboxyl end group concentration (AV) of the polyester resin of the present invention is set to be within the above range. Although a lower limit of the carboxyl end group concentration (AV) is not particularly limited, it is about 8 eq/t or so in view of the decomposition reaction in the polycondensation reaction of the resin. Further, when the carboxyl end group concentration (AV) exceeds the above range, the decomposition reaction is promoted during the film preparation and extrusion even when the intrinsic viscosity (IV) is within the above range whereby the intrinsic viscosity (IV) of the resulting film greatly lowers and the drawdown during the film preparation becomes large. As a result, the film preparation itself becomes difficult. Furthermore, the strength of the resulting film also becomes weak and the aimed quality cannot be achieved. Since the carboxyl end group concentration (AV) of the resulting film also increases, the recovered raw material obtained from the material recycle also becomes in a high AV whereby it is not possible to add the recovered raw material to the raw material at a high rate.

It is also necessary that the color b value in the L*a*b* color system of the polyester resin of the present invention is from 1.0 to 8.0, and preferably from 2.0 to 7.0. When the color b value is lower than above range, bluish tint of the resulting film becomes strong while, when it exceeds the above range, yellowish tint of the resulting film becomes strong. Therefore, the recovered raw material also shows the same color tone whereby it is no longer possible to add the recovered raw material to the raw material at a high rate.

Further, it is necessary that the polyester resin of the present invention contains aluminum atom and phosphorus atom, wherein an amount of the aluminum atom in the polyester resin is 15 to 40 ppm and wherein a molar ratio of the phosphorus atom to the aluminum atom (ratio of P/Al) in the polyester resin is 1.8 to 2.6.

Each of those aluminum atom and the phosphorus atom is derived from the aluminum compound and the phosphorus compound, respectively, used as polymerization catalysts upon polymerization of the polyester resin. Those aluminum compound and phosphorus compound remain in the polyester resin even after the polymerization. Particularly, the residual phosphorus compound gives excellent stability against heat and thermal oxidation to the polyester resin and prevents deterioration of the resin which may be caused by heating of the polyester resin upon the film preparation. Accordingly, in the present invention, the intrinsic viscosity of the resulting film is not greatly lowered even if the intrinsic viscosity of the resin is lowered for making the film-preparation speed high. As a result, the film-preparation property and the film strength can be ensured while reducing the film-production cost.

In the present invention, it is necessary that the amount of aluminum atom in the polyester resin is 15 to 40 ppm. Preferably, it is 17 to 38 ppm, and more preferably, it is 20 to 35 ppm. When the amount of the aluminum atom is less than the above range, the catalytic activity may not be sufficiently achieved. On the contrary, when the amount of aluminum atom exceeds the above range, the stability against heat and thermal oxidation may be lowered, or foreign matters caused by aluminum may be generated, or a coloration may be increased.

In the present invention, the ratio of the phosphorus atom to the aluminum atom is also important. To be more specific, it is necessary in the present invention that the molar ratio of the phosphorus atom to the aluminum atom (ratio of P/Al) in the polyester resin is 1.8 to 2.6. Preferably, it is 2.0 to 2.4, and more preferably, it is 2.1 to 2.3. As mentioned above, the aluminum atom and the phosphorus atom in the polyester resin are derived from the aluminum compound and the phosphorus compound, respectively, used as the polymerization catalyst of the polyester resin. When the aluminum compound is solely used as the polymerization catalyst, its catalytic activity cannot be sufficiently exhibited. On the contrary, when the phosphorus compound is used together with the aluminum compound as the polymerization catalyst in a specific ratio, it is now possible to sufficiently enhance the catalytic activity. When the molar ratio of the phosphorus atom to the aluminum atom in the polyester resin is out of the above range, the function as the polymerization catalyst may not be sufficiently achieved. When the molar ratio of the phosphorus atom to the aluminum atom in the polyester resin is less than the above range, the stability against heat and thermal oxidation may be lowered, or foreign matters caused by aluminum may be generated, or a coloration may be increased. On the contrary, when the molar ratio of the phosphorus atom to the aluminum atom in the polyester resin exceeds the above range, the catalytic activity may not be sufficiently achieved.

With regard to the aluminum atom in the aluminum compound acting as the polymerization catalyst, nearly 100% of its amount firstly added to a system as the polymerization catalyst remains in the polyester resin produced by the polymerization even when the system is placed under an environment of reduced pressure upon polymerization of the polyester resin. Therefore, as to the aluminum atom, it is possible to consider that the amount used as the polymerization catalyst is equal to the residual amount in the resin. Accordingly, there is no problem even if the amount of the aluminum atom is defined by the residual amount instead of the amount used as the polymerization catalyst. As to the phosphorus compound acting as the polymerization catalyst together with the aluminum compound, a part of the amount firstly added to a system as the polymerization catalyst is removed to an outside of the system when the system is placed under an environment of reduced pressure upon polymerization of the polyester resin. However, this removal rate does not greatly vary but is almost constant. Considering this fact that the phosphorus atom is removed in an almost stable removal rate, it can be said that there is no problem even if the amount of the phosphorus atom is defined by the residual amount instead of the amount used as the polymerization catalyst.

As to the aluminum compound from which the aluminum atom is derived and the phosphorus compound from which the phosphorus atom is derived, there is no particular limitation therefor so far as they are commonly used as the polymerization catalysts. Their specific examples will be mentioned in the following explanation of a preparation method of the polyester resin of the present invention.

Now, we will explain the preparation method of the polyester resin of the present invention. The polyester resin of the present invention may be prepared by any of a direct esterification reaction using terephthalic acid as a raw material and a transesterification reaction using dimethyl terephthalate as a raw material of a terephthalic acid component.

A production process for the polyester resin of the present invention is classified into a continuous method and a batch method, depending on a supply mode of the raw material or an extrusion mode of the polymer. The polyester resin of the present invention can be produced by any of those methods. In the present invention, a continuous method is preferred in view of high stability of productivity and of product quality. In the continuous method, the raw material is continuously supplied whereby the esterification reaction is conducted continuously and the polycondensation thereafter is also conducted continuously. In any of those methods, the esterification reaction may be conducted in a single step or may be conducted dividedly in multiple steps. The melt polycondensation reaction may also be conducted in a single step or may be conducted dividedly in multiple steps.

An example of the method for polymerizing the polyester resin according to the present invention is as follows. Thus, neopentyl glycol and diethylene glycol are mixed with the above dicarboxylic acid component containing terephthalic acid as a main component and the above diol component containing ethylene glycol as a main component in a raw material mixing tank whereupon a slurry is prepared. This slurry is supplied to an esterification reaction tank. A temperature for the esterification reaction is usually set at 220 to 260° C., and preferably 230 to 250° C. while pressure in the reaction can is usually set at 0.2 to 0.4 MPa and preferably 0.25 to 0.35 MPa and the esterification reaction is conducted with stirring usually for 2 to 5 hours and preferably 2.5 to 4 hours. The resulting esterification reaction product (oligomer) is transferred to a polycondensation reaction tank.

Polycondensation is conducted with stirring usually at 240 to 290° C., preferably at 250 to 280° C., and more preferably at 260 to 275° C. usually within 5 hours, preferably within 4 hours, and more preferably within 3 hours wherein a final degree of vacuum in the reaction can is usually 10 kPa or lower, preferably 5 kPa or lower, and more preferably 1 kPa or lower. As a result thereof, the aimed degree of polymerization is achieved. The degree of polymerization is controlled by a torque needed for the stirring of the polymer. At a point wherein the desired stirring torque is achieved, an inner area of the reaction can is purged with nitrogen to return to an ordinary pressure whereby the polycondensation is ceased. The resulting polymer is usually transferred to a die from a bottom of the polycondensation reaction tank, drawn out into strands, cut with a cutter together with or after cooling using water and made into particles such as pellets or chips.

In the preparation of the polyester resin of the present invention, a polymerization catalyst is used for enhancing an efficiency of the polycondensation reaction. This polymerization catalyst is characterized in having an ability of promoting the esterification. As to such polymerization catalyst, it is preferred in the present invention to use a combination of the polymerization catalyst containing at least one type selected from aluminum compounds and at least one type selected from phosphorus compounds. The polymerization catalyst may be added to the reaction system in any stage of the polymerization reaction. For example, it can be added to the reaction system in any stage of before or during the esterifying reaction or transesterification reaction, or in any stage immediately before initiation of the polycondensation reaction or during the polycondensation reaction. Among them, it is preferred to add immediately before initiation of the polycondensation reaction.

As to the aluminum compound constituting the polymerization catalyst used in the preparation of the polyester resin of the present invention, it is possible to use known aluminum compound without limitation.

As to the aluminum compound, there are specifically exemplified aluminum acetate, basic aluminum acetate, aluminum lactate, aluminum chloride, aluminum hydroxide and aluminum hydroxide chloride and an organoaluminum compound such as aluminum acetylacetonate and aluminum oxalate as well as partially hydrolyzed products thereof. Among the above, preferred ones are carboxylate, inorganic acid salt and chelate compound and, among them, more preferred ones are aluminum acetate, basic aluminum acetate, aluminum lactate, aluminum chloride, aluminum hydroxide, aluminum hydroxide chloride and aluminum acetylacetonate. Further preferred ones are aluminum acetate, basic aluminum acetate, aluminum chloride, aluminum hydroxide, and aluminum hydroxide chloride. The most preferred ones are aluminum acetate and basic aluminum acetate.

As to the amount of the aluminum compound used as the polymerization catalyst, it is necessary that 15 to 40 ppm remains as an aluminum atom to the total mass of the resulting polyester resin. Preferably, 17 to 38 ppm remains and more preferably, 20 to 35 ppm remains. When the remaining amount of the aluminum atom is less than the above range, the catalytic activity may not be sufficiently achieved. On the contrary, when the remaining amount of aluminum atom exceeds the above range, the stability against heat and thermal oxidation may be lowered, or foreign matters caused by aluminum may be generated, or a coloration may be increased. As explained above, with regard to the aluminum compound, nearly 100% of its amount used as the polymerization catalyst remains even when the system is placed under an environment of reduced pressure upon polymerization of the polyester resin. Therefore, as to the aluminum atom, it is possible to consider that the amount used as the polymerization catalyst is equal to the residual amount in the resin.

There is no particular limitation for the phosphorus compound used as the polymerization catalyst. However, a compound of phosphonic acid type or that of phosphinic acid type is preferable because they greatly enhance the catalytic activity. Among them, a compound of a phosphonic acid type is more preferable because it particularly greatly enhances the catalytic activity.

Preferably, the phosphorus compound has a phenol moiety in the same molecule. Such phosphorus compound greatly enhances the stability of the resin against heat and the stability against thermal oxidation. There is no particular limitation therefor so far as it is a phosphorus compound having a phenol structure. However, one or more type (s) of compound (s) selected from a group consisting of a phosphonic acid-type compound and a phosphinic acid-type compound having a phenol moiety in the same molecule are preferable because they greatly enhance both of the catalytic activity and the stability of the resin against heat and thermal oxidation. Among them, one or more type (s) of a phosphonic acid-type compound having a phenol moiety in the same molecule are more preferable because they particularly greatly enhance both of the catalytic activity and the stability of the resin against heat and thermal oxidation.

As to the phosphorus compound having a phenol moiety in the same molecule, there are exemplified the compounds represented by the following general formulae (1) and (2).

$$P(=O)R^1(OR^2)(OR^3) \qquad \text{general formula (1)}$$

$$P(=O)R^1R^4(OR^2) \qquad \text{general formula (2)}$$

(In the general formulae (1) and (2), $R^1$ is a phenol moiety-containing $C_{1-50}$ hydrocarbon group, or a $C_{1-50}$ hydrocarbon group which contains a substituent such as hydroxyl group or halogen group or alkoxy group or amino group as well as a phenol moiety. $R^4$ is hydrogen, or is a $C_{1-50}$ hydrocarbon group, or is a $C_{1-50}$ hydrocarbon group which contains a substituent such as hydroxyl group or halogen group or alkoxy group or amino group. $R^2$ and $R^3$ each independently is hydrogen, or is a $C_{1-50}$ hydrocarbon group or is a $C_{1-50}$ hydrocarbon group which contains a substituent such as hydroxyl group and alkoxy group. The hydrocarbon group may also contain a branched structure, an alicyclic structure such as cyclohexyl or an aromatic ring structure such as phenyl and naphthyl. Terminals of $R^2$ and $R^4$ may also be bonded each other.

As to the phosphorus compound having a phenol moiety in the same molecule, there are exemplified p-hydroxyphenylphosphonic acid, dimethyl p-hydroxyphenylphosphonate, diethyl p-hydroxyphenylphosphonate, diphenyl p-hydroxyphenylphosphonate, bis(p-hydroxyphenyl) phosphinic acid, methyl bis(p-hydroxyphenyl) phosphinate, phenyl bis-(p-hydroxyphenyl) phosphinate, p-hydroxyphenyl phenylphosphinic acid, methyl (p-hydroxyphenyl) phenylphosphinate, phenyl (p-hydroxyphenyl) phenylphosphinate, p-hydroxyphenyl phosphinic acid, methyl p-hydroxyphenyl phosphinate and phenyl p-hydroxyphenyl phosphinate. Besides the above, a phosphorus compound represented by the following general formula (3) is also exemplified.

general formula (3)

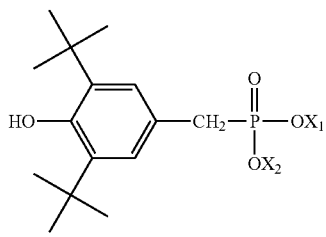

In the general formula (3), $X_1$ and $X_2$ each is hydrogen, an alkyl group having 1 to 4 carbon(s) or a metal of mono- or higher valent.

When $X_1$ is a metal of di- or higher valent, $X_2$ may be absent. Furthermore, an anion corresponding to excessive valence number of the metal may also be arranged to the phosphorus compound.

Preferable metal is Li, Na, K, Ca, Mg or Al.

When the phosphorus compound as such having a phenol moiety in the same molecule is added during the polymerization of the polyester, the catalytic activity of the aluminum compound is enhanced. In addition, the stability of the polyester resin against heat and thermal oxidation is enhanced. The reason therefor is likely to be that a hindered phenol moiety in the phosphorus compound enhances the stability of the polyester resin against heat and thermal oxidation. When the residual amount of the phosphorus compound is 31 ppm or less, the above effect of enhancing the stability against heat and thermal oxidation is reduced. As a result, the enhancing effect of the stability of the polyester resin against heat and thermal oxidation and the enhancing effect for colorization of the present invention may not be achieved.

Among the above, a phosphorus compound which is preferred to be used as the polycondensation catalyst is at least one phosphorus compound selected from the compounds represented by the following formulae (4) and (5).

formula (4)

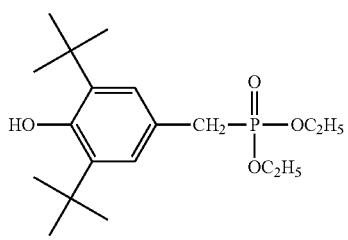

formula (5)

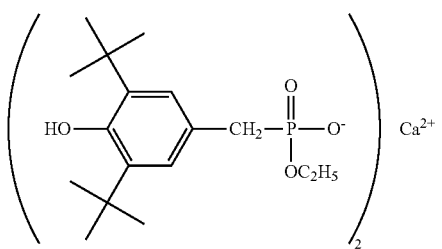

As to the compound represented by the above formula (4), Irganox 1222 (manufactured by BASF) is commercially available. Further, as to the compound represented by the formula (5), Irganox 1425 (manufactured by BASF) is commercially available.

As to the amount of the phosphorus compound used as the polymerization catalyst, it is preferred that 31 to 119 ppm in terms of phosphorus atom remains to the total mass of the resulting copolymerized polyester resin. It is more preferably 39 to 105 ppm remains and further preferably 48 to 92 ppm remains. When the phosphorus atom being outside the above upper and lower limits remains, the polymerization activity may be lowered. As explained above, with regard to the phosphorus compound, a part of the amount firstly added to a system as the polymerization catalyst is removed to an outside of the system when the system is placed under an environment of reduced pressure upon polymerization of the polyester resin. However, this removal rate is almost constant. Considering the removal rate, it can be said that there is no problem even if the amount of the phosphorus atom is defined by the residual amount instead of the amount used as the polymerization catalyst.

Further, as mentioned above, the ratio of the phosphorus compound to the aluminum compound is also important in the present invention. To be more specific, in the present invention, it is necessary that the molar ratio of the phosphorus atom to the aluminum atom (ratio of P/Al) in the polyester resin is 1.8 to 2.6. Preferably, it is 2.0 to 2.4 and more preferably, it is 2.1 to 2.3. When the aluminum compound is solely used as the polymerization catalyst, its catalytic activity cannot be sufficiently exhibited. On the contrary, when the phosphorus compound is used together with the aluminum compound as the polymerization catalyst in a specific ratio, it is now possible to sufficiently enhance the catalytic activity. When the molar ratio of the phosphorus atom to the aluminum atom in the polyester resin is out of the above range, the function as the polymerization catalyst may not be sufficiently achieved.

In the present invention, a metal-containing polycondensation catalyst such as a titanium compound, a tin compound and a germanium compound may also be used in addition to the above aluminum compound and phosphorus compound so as to further enhance the catalytic activity within such an extent that the effect of the present invention is not deteriorated thereby. In that case, an amount of the germanium compound is preferred to be 10 ppm or less in terms of germanium atom to the mass of the resulting polyester resin. An amount of the titanium compound is preferred to be 3 ppm or less in terms of titanium atom to the mass of the resulting polyester resin. An amount of the tin compound is preferred to be 3 ppm or less in terms of tin atom to the mass of the resulting polyester resin. However, in view of the object of the present invention, it is preferable that those metal-containing polycondensation catalysts such as titanium compound, tin compound and germanium compound are not used as much as possible. In addition, an antimony compound which is commonly used as the polymerization catalyst is inferior in the enhancing effect for the stability of the resin against heat and thermal oxidation as mentioned above. Accordingly, the antimony compound should not be used in the present invention.

In the present invention, at least one substance in small amount selected from alkali metal, alkali earth metal and compounds thereof may co-exist as the second metal-containing component in addition to the aluminum compound. Coexistence of the second metal-containing component as such in the catalyst system enhances the catalyst activity in addition to the effect of inhibiting the production of diethylene glycol. Accordingly, it is possible to obtain a catalyst component which exhibits much more enhanced reaction rate, and that is effective in terms of the enhancement of productivity. When alkali metal, alkali earth metal or compound thereof is jointly added and used, the using amount (mol %) is preferably $1\times10^{-5}$ to 0.01 mol % to molar number of the dicarboxylic acid component constituting the polyester resin. With regard to the alkali metal, the alkali earth metal or the compound thereof, nearly 100% of its using amount remains in the polyester resin produced by the polymerization even when the system is placed under an environment of reduced pressure upon polymerization of the polyester resin. Therefore, as to the alkali metal, the alkali earth metal or the compound thereof, it is possible to consider that the using amount is equal to the residual amount in the resin.

For improving the color tone of the copolymerized polyester, a cobalt compound may be compounded therewith. As a result of addition of such cobalt compound, the color b value can be particularly made small. As to the cobalt compound, there are exemplified cobalt acetate, cobalt chloride, cobalt benzoate and cobalt chromate. Among them, cobalt acetate is preferred. A content of the cobalt compound as such is preferably 1 to 30 ppm, more preferably 3 to 20 ppm, and especially preferably 5 to 15 ppm to the polyester resin. When the content of cobalt in the polyester resin is less than the above range, yellowish tint of the polyester resin becomes strong while, when it is more than the above range, the polyester resin becomes dark or bluish tint becomes strong due to a reduction of cobalt metal whereby a commercial value lowers.

The above metal compound may be added before starting the esterification reaction or during any time between after finishing the pressurized esterification reaction and before starting the initial polycondensation reaction. However, when the titanium compound is used as the polycondensation catalyst, it is preferable to add the above metal compound before the esterification reaction. It is also preferable to add other polycondensation catalyst, thermostabilizer and additive after the esterification reaction.

It is preferred that the polyester resin according to the present invention has a melt viscosity of 200 Pa·S or less, when measured at a shear rate of 6080/S at 250° C. When the melt viscosity is high, extrusion becomes difficult unless a resin temperature is increased. In the raw material as in the present invention which contains diethylene glycol abundantly, foreign matters in a film and a sheet after extrusion become abundant when the resin temperature during the extrusion is high whereby it is not preferred. Accordingly, the resin temperature during the extrusion is preferred to be 245° C. or low and more preferred to be 240° C. or low. A lower limit of the resin temperature during the extrusion is a melting point of the raw material. However, the melting point is not clear in the raw material of the present invention and, at 210° C., melting takes place. Accordingly, 210° C. shall be made as the lower limit of the resin temperature during the extrusion. Further, when the melt viscosity measured at 250° C. is 200 Pa·S or more, a load of a machine used for melt extrusion of the raw material becomes high and size of facilities becomes big whereby it is not preferred. The melt viscosity is preferred to be 190 Pa·S or less and more preferred to be 180 Pa·S or less. Furthermore, when the melt viscosity is too low, shearing stress at a discharge part of the melted resin becomes low resulting in the unevenness in thickness whereby it is not preferred. The melt viscosity measured at 250° C. is preferred to be 100 Pa·S or more, and more preferred to be 110 Pa·S or more.

When the heat-shrinkable film of the present invention is made into a film of 40 μm thickness, it is preferable that a number of defect in 1 mm size or more in the lengthwise direction of the film or in the widthwise direction of the film is more than 1.5 per 10 square meters of the film. When the number of defect is large, a part of the defect (foreign substance) results in an omission of ink upon printing and an appearance of a label after printing is deteriorated whereby it is not preferred. The number of the defect in the lengthwise direction of the film or in the widthwise direction of the film is preferred to be 1 or less and more preferred to be 0.5 or less per 10 square meters of the film.

When the heat-shrinkable film of the present invention is immersed for 10 seconds in hot water of 98° C. under an unloaded state for shrinkage and is then immediately immersed for 10 seconds in water of 25° C.±0.5° C. to stop the shrinkage, the heat-shrinking rate (i.e., a heat-shrinking rate in hot water of 98° C.) in the widthwise direction (in the main shrinking direction) of the film is preferred to be from 60% to 85%, wherein the heat-shrinking rate is calculated by the following formula from lengths before and after the shrinking. The heat-shrinking rate in hot water at 98° C. is more preferred to be 63% or more, and further preferred to be 66% or more. Incidentally, a demand is low for a film which has the heat-shrinking rate in hot water of 98° C. in the main shrinking direction of more than 85%, an upper limit of the heat-shrinking rate in hot water is set to be 85%.

Heat-shrinking rate (%)={[(Length before shrinking)−(Length after shrinking)]/(Length before shrinking)}×100     formula (1)

When the heat-shrinking rate in hot water at 98° C. in the main shrinking direction is less than the above range, it is impossible to deal with a demand for a highly shrinking film covering the whole container (so-called full label). Moreover, when the film is used as a label, strain, insufficient shrinking, wrinkle, slack, etc. may occur in the label after the heat-shrinking due to small shrinking amount.

Further, in the heat-shrinkable film of the present invention, the heat-shrinking rate in hot water of 98° C. in the direction being orthogonal to the main shrinking direction of the film (the lengthwise direction) being measured in the same manner as above is preferred to be from −5% to 10%. The heat-shrinking rate in hot water at 98° C. in the orthogonal direction to the main shrinking direction is more preferred to be 8% or less, and further preferred to be 6% or less. When the heat-shrinking rate in hot water at 98° C. in the orthogonal direction to the main shrinking direction is less than the above range, a stretched length of the film by heating is too much and, in a use as a label for a container, no good shrunk appearance can be resulted whereby it is not preferred. On the contrary, when the heat-shrinking rate in hot water of 98° C. in the orthogonal direction to the main shrinking direction is more than the above range, the label after the heat-shrinking becomes short (i.e. a height of the label decreases) and the label area becomes small whereby it is not preferred as the full label. Also, strain is apt to occur in the label after the heat-shrinking whereby it is not preferred.

Incidentally, when the heat-shrinking rate in hot water of 98° C. in the orthogonal direction to the main shrinking direction is less than −5%, the height of a label after shrinking becomes high and, as a result, an excessive part is in a state of overabundance causing the winkles whereby a lower limit is set to be −5%.

In the heat-shrinkable film of the present invention, it is preferred that the maximum shrinking stress measured under hot air of 90° C. is 2 MPa to 7 MPa in the main shrinking direction of the film and that a shrinking stress after 30 seconds from a start of the measurement of shrinking stress is from 60% to 100% of the maximum shrinking stress. The maximum shrinking stress at 90° C. is more preferred to be 6 MPa or less and further preferred to be 5 MPa or less. Also, the maximum shrinking stress at 90° C. is more preferred to be 2.5 MPa or more and further preferred to be 3 MPa or more. Incidentally, measurement of the shrinking stress is carried out by the method mentioned in Examples.

When the maximum shrinking stress at 90° C. in the main shrinking direction of the film is more than the above range, although there is no problem therein in a case of containers of PET bottles, crash by the shrinking stress occurs during the shrinking in a case of containers having a thin thickness whereby it is not preferred. When the maximum shrinking stress at 90° C. in the main shrinking direction of the film is less than the above range, in a use as a label for a container, there are some cases wherein the label becomes loose and does not tightly adhere to the container whereby it is not preferred.

When the heat-shrinkable film of the present invention is immersed for 10 seconds in hot water of 70° C. under an unloaded state for shrinkage and is then immediately immersed for 10 seconds in water of 25° C.±0.5° C. to stop the shrinkage, the heat-shrinking rate (i.e., a heat-shrinking rate in hot water of 70° C.) in the widthwise direction (in the main shrinking direction) of the film is preferred to be from 25% to 50%, wherein the heat-shrinking rate is calculated by the above formula 1 from lengths before and after the shrinking. The heat-shrinking rate in hot water at 70° C. is more preferred to be 30% or more, and further preferred to be 35% or more. When the heat-shrinking rate in hot water at 70° C. in the main shrinking direction is less than the above range, in a use as a label, strain, insufficient shrinking, wrinkle, slack, etc. may occur in the label after the heat-shrinking due to small shrinking amount when the label is shrunk with a device which uses a hot air as a heat source. Incidentally, a demand is low for a film which has the heat-shrinking rate in hot water of 70° C. in the main shrinking direction of more than 50%, an upper limit of the heat-shrinking rate in hot water is set to be 50%.

In the heat-shrinkable film of the present invention, it is preferred that the difference between a heat-shrinking rate in hot water when the film which has not been subjected to any aging treatment is immersed for 10 seconds in hot water of 70° C. and a heat-shrinking rate in hot water when the film which has been subjected to an aging treatment for 672 hours in an atmosphere of 40° C. temperature and 65% relative humidity is immersed for 10 seconds in hot water of 70° C. is from 0% to 5% (following formula (2)). The difference in the shrinking rates in hot water is more preferred to be 4% or less, and further preferred to be 3% or less. When the difference in the shrinking rates in hot water of 70° C. before and after the aging is big, temperature conditions during the step wherein the film is shrunk into a label are different before and after the aging whereby it is not preferred. Particularly when the films before and after the aging are used in a mixed manner depending upon a stockpile state, appearances of the finish after shrinking are different if the heat-shrinking is conducted in an industrially continuous manner whereby it is not preferred. Incidentally, the most desirable outcome is that the difference in the heat-shrinking rates in hot water does not change before and after the aging. This is why the lower limit is set to be 0%.

$$\text{Difference in heat-shrinking rates (\%)=(Shrinking rate in hot water before aging)-(Shrinking rate in hot water after aging)} \quad \text{formula (2)}$$

In the heat-shrinkable film of the present invention, it is preferred that, after the film has been subjected to the aging treatment for 672 hours in an atmosphere of 40° C. temperature and 65% relative humidity, a natural shrinking rate calculated by the following formula (3) is from 0.1% to 0.6% in the main shrinking direction of the film. The natural shrinking rate is more preferred to be 0.5% or less and further preferred to be 0.4% or less. When the natural shrinking rate in the main shrinking direction (in the widthwise direction of the film) is higher than the above range, there is a possibility that a width of a rolled product of the film decreases and the width does not match in the processing stage such as printing. Incidentally, although the natural shrinking rate is most preferred to be 0%, only to an extent of 0.1% could be actually achieved in the present invention whereby the lower limit is set to be 0.1%.

$$\text{Natural shrinking rate (\%)=\{[(Length after aging)-(Length before aging)]/(Length before aging)\}}\times 100 \quad \text{formula (3)}$$

In the heat-shrinkable film of the present invention, it is preferred that, after the film has been subjected to the aging treatment for 672 hours in an atmosphere of 40° C. temperature and 65% relative humidity, a tensile elongation at break is 30% or more in the orthogonal direction to the main shrinking direction of the film (lengthwise direction). The tensile elongation at break is more preferred to be 40% or more, and further preferred to be 50% or more. When the tensile elongation at break is less than the above range, there is a possibility that the film is torn due to a tension in the lengthwise direction being loaded upon the printing or processing of the rolled product.

In the heat-shrinkable film of the present invention, its thickness is preferred to be from 10 μm to 50 μm although there is no particular limitation therefor. More preferred lower limit for the thickness is 15 μm.

The heat-shrinkable film of the present invention can be prepared in such a manner that the polyester resin of the present invention is subjected to a melt extrusion using an extruder, and then the resulting non-stretched film is subjected to a stretching in the widthwise direction. Incidentally, the polyester resin can be prepared by polycondensation of the above-mentioned suitable dicarboxylic acid component and diol component by a known method. Usually, polyester in chips is used as a raw material for the film.

In subjecting the polyester resin to the melt extrusion, it is preferred that the polyester resin is dried in advance using a drier such as a hopper drier or a paddle drier or using a vacuum drier. After the polyester resin is dried as such, it is melted at a temperature of 230 to 270° C. using the extruder and is extruded into a film. In conducting such extrusion, it is possible to adopt any of known methods such as a T die method or a tubular method.

When the melted resin in a sheet form after the extrusion is quickly cooled, a non-stretched film can be prepared. As to a method for quick cooling of the melted resin, there may adopted a method wherein the melted resin is cast onto a rotating drum from mouthpieces to quickly solidify whereupon a substantially non-orientated resin sheet is prepared.

By preparing the heat-shrinkable film of the present invention according to the following methods (1) and (2), it is possible to express the properties thereof more advantageously.

(1) Control of Conditions for the Lateral Stretching

In the lateral stretching, the film is previously heated at a temperature of from (Tg+10° C.) to (Tg+25° C.) under such a state that both ends of the film in the widthwise direction are held by clips in a tenter. After that, it is preferred to stretch to an extent of from 3.5 times to 6 times in the widthwise direction together with cooling so as to decrease the temperature to a range from (Tg−5° C.) to (Tg+9° C.). As a result of stretching in the widthwise direction together with cooling, a value of stress ratio [(tensile stress upon final stretching)/(upper yield point stress)] of a stress-strain curve becomes high and it is now possible to decrease the unevenness in thickness in the widthwise direction. After the lateral stretching, it is preferred to subject the film to a heat treatment at a temperature of from (the stretching temperature +1° C.) to (the stretching temperature +10° C.). When the heat treatment temperature is lower than the stretching temperature, a relaxation of a molecular orientation is insufficient and the natural shrinking rate becomes high whereby it is not preferred. When the heat treatment temperature is higher than (the stretching temperature+10° C.), the shrinking rate in the widthwise direction lowers whereby it is not preferred.

(2) Relax in the Widthwise Direction after the Lateral Stretching

In the heat treatment step, it is preferred to relax to an extent of from 0% to 5% in the widthwise direction (0% is without relax) under such a state wherein both ends of the film in the widthwise direction are held by clips in a tenter. As a result of conducting the relax, the shrinking rate in the widthwise direction somewhat lowers but the molecular orientation is subjected to relaxation in the widthwise direction and it is now possible to lower the shrinking stress and the natural shrinking rate. In addition, as a result of conducting the heat treatment at a temperature higher than the stretching temperature in the final heat treatment step, the molecular orientation is subjected to relaxation and it is now possible to lower the shrinking stress and the natural shrinking rate.

The heat-shrinkable label of the present invention is formed using the heat-shrinkable film of the present invention. The packaged product of the present invention is formed in such a manner that the heat-shrinkable label having perforations or notches prepared from the heat-shrinkable film of the present invention is coated at least on a part of an outer periphery of a target to be packaged followed by subjecting to a heat-shrinking treatment. Examples of the target to be packaged include PET bottles for beverages; various kinds of bottles and cans; plastic containers for confectionery, lunch box, etc.; and boxes made of paper. It is common that, when the target to be packaged is coated by means of heat-shrinking of the label prepared by the heat-shrinkable film, the label is subjected to heat-shrinking to an extent of about 5 to 70% and is closely adhered to the target to be packaged. Incidentally, the label for coating the target to be packaged may be either with print or without print.

With regard to a method for preparing the heat-shrinkable label from the heat-shrinkable film of the present invention, there are a method wherein an organic solvent is applied to an area which is a bit inside from an end of one side of a rectangular film, the film is then immediately made round and the ends thereof are layered and adhered to make into a label, and a method wherein an organic solvent is applied to an area which is a bit inside from an end of one side of a wound film in a roll shape, the film is then immediately made round and the ends thereof are layered and adhered and the resulting tube-shaped one is cut into a label. As to the organic solvent for the adhesion, it is preferred to use a cyclic ether such as 1,3-dioxorane or tetrahydrofuran. Besides the above, it is also possible to use an aromatic hydrocarbon such as benzene, toluene, xylene or trimethylbenzene; a halogenated hydrocarbon such as methylene chloride or chloroform; a phenol compound such as phenol; and a mixture thereof.

EXAMPLES

The present invention will now be more specifically illustrated by way of Examples and Comparative Examples although the present invention is never limited to the embodiments of such Examples but may be appropriately modified within a scope of the gist of the present invention.

Incidentally, evaluations of each characteristic property data were done in accordance with the following methods.
Method for Measuring the Carboxyl End Group Concentration in Oligomer (OLG-AV)

The oligomer (0.2 g) was precisely weighed and dissolved in 20 mL of chloroform. It was titrated in a 0.1N ethanolic solution of potassium hydroxide using phenolphthalein as an indicator. An equivalent (unit: eq/ton) per 1 ton of the resin was determined.
Method for Measuring the Hydroxyl End Group concentration in oligomer (OLG-OHV)

The oligomer (0.5 g) was precisely weighed, 10 mL of an acetylating agent (0.5 mol/L solution of acetic anhydride in pyridine) was added thereto and the mixture was immersed for 90 minutes in a water tank of 95° C. or higher. Immediately after it was taken out from the water tank, 10 mL of pure water was added thereto and the mixture was allowed to cool until room temperature. It was then titrated in a 0.2N methanolic solution of sodium hydroxide using phenolphthalein as an indicator. In accordance with a common method, the hydroxyl group was calculated using the above value of the carboxyl group (unit: eq/ton).
Calculation of the Ratio of Hydroxyl Group in the Oligomer (OLG-OH %)

The ratio of the hydroxyl group was calculated according to the following formula 4 from the carboxyl group and the hydroxyl group determined by the above method. In the following formula 4, a sum of the hydroxyl group and the carboxyl group is considered as a total number of the oligomer end.

$$\text{Ratio of hydroxyl group} = \{(\text{Hydroxyl group})/[(\text{Hydroxyl group})+(\text{Carboxyl group})]\} \times 100 \quad \text{formula (4)}$$

Method for Analyzing the Composition of the Polyester Resin

A sample (5 mg) was dissolved in 0.6 ml of a mixed solution of heavy chloroform and trifluoroacetic acid (ratio by volume: 9/1). Copolymerized ratios with terephthalic acid, ethylene glycol, neopentyl glycol and diethylene glycol were determined using $^1$H-NMR (UNITY 50 manufactured by Varian).
Content of Aluminum Atom in the Polyester Resin A sample (0.1 g) was dissolved in a 6M hydrochloric acid solution. The resulting solution was allowed to stand for one day and diluted with pure water so as to give a 1.2M hydrochloric acid solution for the measurement. The content of aluminum atom in the polyester resin was determined based on the prepared solution specimen by a high-frequency plasma emission spectrometry.
Content of Phosphorus Atom in the Polyester Resin A phosphoric compound in a sample (1 g) was changed to orthophosphoric acid either by a method wherein the sample was subjected to a dry incineration in the co-presence of sodium carbonate or by a method wherein the sample was subjected to a wet decomposition by a mixed liquid of sulfuric acid/nitric acid/perchloric acid or by a mixed liquid of sulfuric acid/aqueous solution of hydrogen peroxide. After that, orthophosphoric acid was reacted with a molybdate in 1 mol/L sulfuric acid solution to as to make into phosphomolybdic acid followed by reducing with hydrazine sulfate whereupon heteropoly blue was prepared. Absorbance thereof at 830 nm wavelength was measured using an absorptiometer (UV-150-02 manufactured by Shimadzu). Amount of atomic phosphorus in the sample was determined by using a previously-prepared calibration curve.

Content of Antimony Atom in the Polyester Resin

A sample (1 g) was subjected to wet decomposition by a mixed liquid of sulfuric acid with an aqueous solution of hydrogen peroxide. After that, sodium nitrite was added thereto so as to change an antimony atom to $Sb^{+5}$ followed by adding Brilliant Green thereto whereby a blue complex with antimony was formed. This complex was extracted with toluene. Absorbance thereof at 620 nm wavelength was measured using an absorptiometer (UV-150-02 manufactured by Shimadzu). Amount of atomic antimony in the sample was determined by colorimetry using a previously-prepared calibration curve.

Content of Cobalt Atom in the Polyester Resin

A sample (1 g) was subjected to incineration using a platinum crucible and 6 mol/L hydrochloric acid was added thereto followed by evaporating to dryness. This was dissolved in 1.2 mol/L hydrochloric acid. An intensity of luminescence was measured using an ICP emission spectroscopic analysis apparatus (ICPS-2000 manufactured by Shimadzu). Amount of atomic cobalt in the sample was determined by using a previously-prepared calibration curve.

Method for Measuring the Intrinsic Viscosity (IV) of the Polyester Resin

A sample (0.1 g) being dried at 60° C. for 24 hours was precisely weighed and dissolved in a mixed solvent of 25 mL of phenol/tetrachloroethane (in a ratio of 3/2 by mass). Its intrinsic viscosity was measured at 30° C. using an Ostwald viscometer.

Method for Measuring the Carboxyl End Group Concentration (AV) in the Polyester Resin A sample (0.2 g) being dried at 60° C. for 24 hours was precisely weighed and its weight at that time was set to be W (g). To a test tube were added 10 ml of benzyl alcohol and the weighed sample, the test tube was then dipped in an oil bath heated at 205° C. and the sample was dissolved therein together with stirring with a glass rod. The sample wherein a dissolving time was set to be 3 minutes, 5 minutes or 7 minutes was referred to as A, B or C, respectively. After that, a test tube was newly prepared, only benzyl alcohol was placed therein and treated under the same process. The sample wherein the dissolving time was set to be 3 minutes, 5 minutes or 7 minutes was referred to as a, b or c, respectively. Titration was conducted using a 0.04 mol/1 solution of potassium hydroxide (an ethanolic solution), a factor of which was known already. Phenol Red was used as an indicator. A point wherein a color changed from yellowish green to pink was adopted as an end point, and a titrated amount (ml) of the potassium hydroxide solution was determined. Titrated amounts for the samples A, B and C were referred to as XA, XB and XC (ml), respectively. Titrated amounts for the samples a, b and c were referred to as Xa, Xb and Xc (ml), respectively. The titrated amount V (ml) wherein the dissolving time was 0 minute was determined by a least-squares method using the titrated amount XA, XB or XC for each dissolving time. Similarly, the titrate amount V0 (ml) was determined using Xa, Xb or Xc. After that, AV was determined in accordance with the following formula 5.

$$AV(eq/t)=[(V-V0)\times NF\times 1000]/W \qquad \text{formula (5)}$$

NF: factor of 0.04 mol/1 potassium hydroxide solution
W: weight of sample (g)

Method for Measuring the Color b Value of the Polyester Resin

The color b value was measured using a colorimetric color-difference meter (ZE-6000 manufactured by Nippon Denshoku) from the tristimulus values XYZ expressing the basic stimulation values of the color. The higher the value, the stronger the yellowish tint.

Method for Measuring the Glass Transition Point (Tg) of the Polyester Resin

A temperature of the sample (5 mg) was raised from −40° C. to 120° C. at a raising speed of 10° C. per minute, by using a differential scanning calorimeter (type: DSC220; manufactured by Seiko Electronic Industry). The glass transition point was determined from the resulting endothermic curve. Specifically, a temperature of a crossing point of an extended line of a base line being under the glass transition temperature to a tangent showing a maximum inclination in a transition part was defined as the glass transition temperature (Tg).

Evaluation of a Recycling Property of the Polyester Resin (LPM Extrusion)

A polyester resin being dried at 60° C. for 24 hours was poured into a portable kneader (Labo Plastomill 20C200 manufactured by Toyo Seiki) which was previously heated at 280° C., and kneaded for 2 minutes at 60 rpm. After taking out the resin therefrom, it was cut into chips and subjected to the measurement of IV, AV and color b value by the same method as mentioned hereinabove. When the polyester resin satisfied such requirements that ΔIV was −0.12 dl/g or more, ΔAV was 14 eq/t or less and Δ (color b value) was 4.0 or less, it was judged that the recycling property was good (expressed as "∘"). When the polyester resin did not satisfy the above requirements, it was judged that the recycling property was bad (expressed as "x"). A thermal hysteresis in this evaluation corresponds to a thermal hysteresis in the film preparation. When the recycling property is judged to be good, it is believed that a waste film consisting of such polyester resin can be recycled.

Film-Preparation Property

The film-preparation property was evaluated based on an extrusion pressure, and based on a production trouble due to drawdown or the like when the resin is extruded at 250° C. for the film preparation. Specific criteria for the judgment are as follows.

∘: There is neither a rise of the extrusion pressure nor the production trouble, and the film is prepared stably.

Δ: The extrusion pressure gradually rises or the production trouble is generated, and the film preparation is unstable.

x: Rise in the extrusion pressure and the production trouble frequently happen, and it is difficult to prepare the film stably.

Heat-Shrinking Rate (Heat-Shrinking Rate in Hot Water) Before the Aging

A film was cut into squares each being in a size of 10 cm×10 cm to make a film sample. Then, the sample was immersed for 10 seconds under an unloaded state in hot water of (predetermined temperature)±0.5° C. for heat-shrinkage, and was then immediately immersed for 10 seconds in water of 25° C.±0.5° C. to stop the shrinkage. After the sample was taken out from water, sizes of the film in longitudinal and lateral directions were measured and the heat-shrinking rate was determined according to the following formula (6).

Heat-shrinking rate (%)={[(Length before shrinking)−(Length after shrinking)]/(Length before shrinking)}×100   formula (6)

Heat-Shrinking Rate after the Aging

A film was aged for 672 hours in a chamber for environmental test wherein temperature was 40° C. and humidity was 65%. Then, similar to the measurement of the above heat-shrinking rate, sizes of the film in longitudinal and lateral directions were measured and the heat-shrinking rate after the aging was determined according to the above formula.

Difference in the Heat-Shrinking Rates Before and after the Aging

Difference in the heat-shrinking rates before and after the aging was determined according to the following formula (7).

Difference in heat-shrinking rates (%)=(Heat-shrinking rate in hot water before aging)−(Heat-shrinking rate in hot water after aging)   formula (7)

Natural Shrinking Rate

Marker lines were drawn on a film so as to make a distance between them 200 mm. After that, the distance (mm) between the marker lines was read to 1 decimal place. After that, the film was aged for 672 hours in a chamber for environmental test wherein temperature was 40° C. and humidity was 65%. After that, the distance between the marker lines was read similarly. Natural shrinking rate was determined according to the following formula (8).

Natural shrinking rate (%)={[(Length after aging)−(Length before aging)]/(Length before aging)}×100   formula (8)

Tensile Elongation at Break

The film was aged for 672 hours in a chamber for environmental test wherein temperature was 40° C. and humidity was 65%. After that, a film sample in a rectangular shape was cut out so that the film sample has a length in the lengthwise direction of the film of 140 mm and a length in the orthogonal direction to the measurement direction (in the widthwise direction of the film) of 20 mm. Both ends of the film sample were held in such a manner that each one end was held to an extent of 20 mm by each chuck (a distance between the chucks: 100 mm) using a universal tensile tester "DSS-100" (manufactured by Shimadzu). A tensile test was conducted under conditions wherein environmental temperature was 23° C. and tensile velocity was 200 mm/min. An elongation upon a tensile break was adopted as the tensile elongation at break.

Shrinking Stress

A film sample in a rectangular shape having a length in the main shrinking direction (in the widthwise direction) of 200 mm and a width of 20 mm was cut out from a film. The shrinking stress of this sample was measured using a measuring machine for strength and elongation (Tesilon Universal Tester PTM-250; registered trade mark of Orientec) equipped with a heating furnace manufactured by Toyo Baldwin (current company name: Orientec). An inner space of the heating furnace of the measuring machine for strength and elongation was previously heated at 90° C. A distance between chucks for holding the film sample was made 100 mm. In attaching the sample to the chucks of the measuring machine for strength and elongation, ventilation to the heating furnace was once stopped and a door of the heating furnace was opened. Each 25 mm of both ends of the sample in 150 mm in the lengthwise direction was sandwiched between the chucks. The distance between the chucks was made 100 mm and fixation without loosening was done so that the lengthwise direction between the chucks and the lengthwise direction of the sample were identical and the sample became horizontal. After the sample was attached to the chucks, the door of the heating furnace was quickly closed and the ventilation was started again. A stage wherein the door of the heating furnace was closed and the ventilation was started again was adopted as a starting point for measuring the shrinking stress. The shrinking stress (MPa) after 30 seconds was determined.

Method for Preparing the Polyester Resin

The polyester resins referred as raw material resins 1 to 22 were manufactured by a known method wherein polycondensation was conducted via the following esterification reaction and transesterification reaction in accordance with reaction conditions and qualities mentioned in Table 1.

(Raw Material Resins 1 to 21)

Terephthalic acid and glycol (ethylene glycol, neopentyl glycol and diethylene glycol) in a specific ratio (G/T: molar ratio of glycol/terephthalic acid) were added to a polymerization device equipped with stirrer, distillation column and pressure adjuster. Under conditions wherein a reaction temperature was 240° C. and a reaction pressure was 0.35 MPa, an esterification reaction was conducted for a reaction time shown in Table 1 together with successive removal of water produced during the esterification reaction.

Then, predetermined amounts of an ethylene glycol solution of an aluminum compound (basic aluminum acetate) and an ethylene glycol solution of a phosphorus compound (Irganox 1222: the above-mentioned formula 4) were added. After that, the reaction temperature of the system was raised up to 280° C. within one hour and, during that time, the pressure of the system was gradually decreased to 0.15 kPa. The polycondensation reaction was conducted while keeping the system together with successive removal of glycol which was produced during the polycondensation. At a stage when a predetermined stirring torque was resulted, an inner area of the reactor was purged with nitrogen so as to return to an ordinary pressure. The polyester resin was taken out from the polymerization device, solidified by cooling with water and made into pellets using a strand cutter.

(Raw Material Resin 22)

Terephthalic acid and glycol (ethylene glycol, neopentyl glycol and diethylene glycol) in a specific ratio (G/T: molar ratio of glycol/terephthalic acid) were added to a polymerization device equipped with stirrer, distillation column and pressure adjuster. After that, a predetermined amount of antimony compound (antimony trioxide) was added thereto. Under conditions wherein a reaction temperature was 240° C. and a reaction pressure was 0.35 MPa, an esterification reaction was conducted for a reaction time shown in Table 1 together with successive removal of water produced during the esterification reaction. After the reaction, predetermined amounts of trimethyl phosphate and cobalt compound (cobalt acetate) were added to give an oligomer. After that, the reaction temperature of the system was raised up to 275° C. within one hour and, during that time, the pressure of the system was gradually decreased so that a reaction vacuum degree was made 0.15 kPa. The polycondensation reaction was conducted while keeping the system together with successive removal of glycol which was produced during the polycondensation. At a stage when a predetermined stirring torque was resulted, an inner area of the reactor was purged with nitrogen so as to return to an ordinary pressure. The polyester resin was taken out from the polymerization device, solidified by cooling with water and made into pellets using a strand cutter.

TABLE 1

| Items | | Raw material resin 1 | Raw material resin 2 | Raw material resin 3 | Raw material resin 4 | Raw material resin 5 | Raw material resin 6 |
|---|---|---|---|---|---|---|---|
| Raw material charge | G/T (molar ratio of glycol/terephthalic acid) | 1.5 | 1.5 | 1.5 | 1.6 | 1.5 | 1.5 |
| Esterification reaction | reaction temperature (° C.) | 240 | 240 | 240 | 240 | 240 | 240 |
| | reaction time (hr) | 3.0 | 3.0 | 3.0 | 3.0 | 3.0 | 3.0 |
| | reaction vacuum degree (kPa) | 0.35 | 0.35 | 0.35 | 0.35 | 0.35 | 0.35 |
| Physical properties of oligomer | OLG-AV (eq/t) | 880 | 870 | 880 | 800 | 900 | 850 |
| | OLG-OHV (eq/t) | 4780 | 4800 | 4750 | 5200 | 4620 | 4860 |
| | OLG-OH % | 84 | 85 | 84 | 87 | 84 | 85 |
| Polycondensation reaction | reaction temperature (° C.) | 280 | 280 | 280 | 280 | 280 | 280 |
| | reaction time (hr) | 2.0 | 1.9 | 1.8 | 2.2 | 1.9 | 1.9 |
| | reaction vacuum degree (kPa) | 0.15 | 0.15 | 0.15 | 0.15 | 0.15 | 0.15 |
| Compositions of resins (mol %) | terephthalic acid | 100 | 100 | 100 | 100 | 100 | 100 |
| | ethylene glycol | 70 | 70 | 70 | 70 | 70 | 70 |
| | neopentyl glycol | 22 | 22 | 22 | 22 | 22 | 22 |
| | diethylene glycol | 8 | 8 | 8 | 8 | 8 | 8 |
| Physical properties of resins | intrinsic viscosity (IV) (dl/g) | 0.69 | 0.67 | 0.66 | 0.69 | 0.69 | 0.69 |
| | carboxyl end group concentration (AV) (eq/t) | 11 | 13 | 14 | 11 | 11 | 9 |
| | color b value | 2.3 | 2.2 | 2.2 | 2.4 | 2.1 | 2.7 |
| | Tg (° C.) | 72 | 72 | 72 | 72 | 72 | 72 |
| Amount of remaining metal (ppm) | aluminum | 30 | 30 | 30 | 30 | 30 | 35 |
| | phosphorus | 77 | 77 | 77 | 87 | 65 | 90 |
| | antimony | — | — | — | — | — | — |
| | cobalt | — | — | — | — | — | — |
| | molar ratio of phosphorus atom to aluminum atom | 2.2 | 2.2 | 2.2 | 2.5 | 1.9 | 2.2 |

| Items | | Raw material resin 7 | Raw material resin 8 | Raw material resin 9 | Raw material resin 10 | Raw material resin 11 | Raw material resin 12 |
|---|---|---|---|---|---|---|---|
| Raw material charge | G/T (molar ratio of glycol/terephthalic acid) | 1.5 | 1.5 | 1.6 | 1.5 | 1.5 | 1.5 |
| Esterification reaction | reaction temperature (° C.) | 240 | 240 | 240 | 240 | 240 | 240 |
| | reaction time (hr) | 3.0 | 3.0 | 3.0 | 3.0 | 3.0 | 3.0 |
| | reaction vacuum degree (kPa) | 0.35 | 0.35 | 0.35 | 0.35 | 0.35 | 0.35 |
| Physical properties of oligomer | OLG-AV (eq/t) | 830 | 840 | 780 | 840 | 890 | 880 |
| | OLG-OHV (eq/t) | 4800 | 4800 | 5150 | 4650 | 4700 | 4650 |
| | OLG-OH% | 85 | 85 | 87 | 85 | 84 | 84 |
| Polycondensation reaction | reaction temperature (° C.) | 280 | 280 | 280 | 280 | 280 | 280 |
| | reaction time (hr) | 1.8 | 1.8 | 2.1 | 1.8 | 2.3 | 2.2 |
| | reaction vacuum degree (kPa) | 0.15 | 0.15 | 0.15 | 0.15 | 0.15 | 0.15 |
| Compositions of resins (mol %) | terephthalic acid | 100 | 100 | 100 | 100 | 100 | 100 |
| | ethylene glycol | 70 | 70 | 70 | 70 | 70 | 70 |
| | neopentyl glycol | 22 | 22 | 22 | 22 | 22 | 22 |
| | diethylene glycol | 8 | 8 | 8 | 8 | 8 | 8 |
| Physical properties of resins | intrinsic viscosity (IV) (dl/g) | 0.67 | 0.66 | 0.69 | 0.69 | 0.69 | 0.67 |
| | carboxyl end group concentration (AV) (eq/t) | 12 | 13 | 9 | 9 | 13 | 15 |
| | color b value | 2.5 | 2.3 | 2.6 | 2.4 | 2.2 | 2.1 |
| | Tg (° C.) | 72 | 72 | 72 | 72 | 72 | 72 |
| Amount of remaining metal (ppm) | aluminum | 35 | 35 | 35 | 35 | 20 | 20 |
| | phosphorus | 90 | 90 | 100 | 78 | 50 | 50 |
| | antimony | — | — | — | — | — | — |
| | cobalt | — | — | — | — | — | — |
| | molar ratio of phosphorus atom to aluminum atom | 2.2 | 2.2 | 2.5 | 1.9 | 2.2 | 2.2 |

| Items | | Raw material resin 13 | Raw material resin 14 | Raw material resin 15 | Raw material resin 16 | Raw material resin 17 | Raw material resin 18 |
|---|---|---|---|---|---|---|---|
| Raw material charge | G/T (molar ratio of glycol/terephthalic acid) | 1.5 | 1.5 | 1.5 | 1.5 | 1.5 | 1.6 |
| Esterification reaction | reaction temperature (° C.) | 240 | 240 | 240 | 240 | 240 | 240 |

TABLE 1-continued

|  |  | | | | | | |
|---|---|---|---|---|---|---|---|
| | reaction time (hr) | 3.0 | 3.0 | 3.0 | 3.0 | 3.0 | 3.0 |
| | reaction vacuum degree (kPa) | 0.35 | 0.35 | 0.35 | 0.35 | 0.35 | 0.35 |
| Physical properties of oligomer | OLG-AV (eq/t) | 860 | 850 | 900 | 880 | 860 | 780 |
| | OLG-OHV (eq/t) | 4720 | 4800 | 4550 | 4700 | 4750 | 4900 |
| | OLG-OH% | 85 | 85 | 83 | 84 | 85 | 86 |
| Polycondensation reaction | reaction temperature (° C.) | 280 | 280 | 280 | 280 | 280 | 280 |
| | reaction time (hr) | 2.1 | 2.5 | 2.0 | 2.1 | 2.1 | 1.8 |
| | reaction vacuum degree (kPa) | 0.15 | 0.15 | 0.15 | 0.15 | 0.15 | 0.15 |
| Compositions of resins (mol %) | terephthalic acid | 100 | 100 | 100 | 100 | 100 | 100 |
| | ethylene glycol | 70 | 70 | 70 | 63 | 65 | 70 |
| | neopentyl glycol | 22 | 22 | 22 | 30 | 20 | 22 |
| | diethylene glycol | 8 | 8 | 8 | 7 | 15 | 8 |
| Physical properties of resins | intrinsic viscosity (IV) (dl/g) | 0.66 | 0.69 | 0.69 | 0.69 | 0.69 | 0.69 |
| | carboxyl end group concentration (AV) (eq/t) | 16 | 13 | 13 | 11 | 11 | 8 |
| | color b value | 2.3 | 2.3 | 2.4 | 2.1 | 2.6 | 2.1 |
| | Tg (° C.) | 72 | 72 | 72 | 72 | 68 | 72 |
| Amount of remaining metal (ppm) | aluminum | 20 | 20 | 20 | 30 | 30 | 45 |
| | phosphorus | 50 | 58 | 44 | 77 | 77 | 115 |
| | antimony | — | — | — | — | — | — |
| | cobalt | — | — | — | — | — | — |
| | molar ratio of phosphorus atom to aluminum atom | 2.2 | 2.5 | 1.9 | 2.2 | 2.2 | 2.2 |

| Items | | Raw material resin 19 | Raw material resin 20 | Raw material resin 21 | Raw material resin 22 |
|---|---|---|---|---|---|
| Raw material charge | G/T (molar ratio of glycol/ terephthalic acid) | 1.5 | 1.6 | 1.5 | 2.0 |
| Esterification reaction | reaction temperature (° C.) | 240 | 240 | 240 | 240 |
| | reaction time (hr) | 3.0 | 3.0 | 3.0 | 3.5 |
| | reaction vacuum degree (kPa) | 0.35 | 0.35 | 0.35 | 0.35 |
| Physical properties of oligomer | OLG-AV (eq/t) | 850 | 790 | 860 | 450 |
| | OLG-OHV (eq/t) | 4600 | 5300 | 4600 | 6250 |
| | OLG-OH% | 84 | 87 | 84 | 93 |
| Polycondensation reaction | reaction temperature (° C.) | 280 | 280 | 280 | 275 |
| | reaction time (hr) | 3.8 | 3.5 | 2.5 | 2.0 |
| | reaction vacuum degree (kPa) | 0.15 | 0.15 | 0.15 | 0.15 |
| Compositions of resins (mol %) | terephthalic acid | 100 | 100 | 100 | 100 |
| | ethylene glycol | 70 | 70 | 70 | 65 |
| | neopentyl glycol | 22 | 22 | 22 | 25 |
| | diethylene glycol | 8 | 8 | 8 | 10 |
| Physical properties of resins | intrinsic viscosity (IV) (dl/g) | 0.63 | 0.63 | 0.69 | 0.65 |
| | carboxyl end group concentration (AV) (eq/t) | 20 | 19 | 10 | 17 |
| | color b value | 4.2 | 4.0 | 2.5 | 5.9 |
| | Tg (° C.) | 72 | 72 | 72 | 70 |
| Amount of remaining metal (ppm) | aluminum | 10 | 20 | 30 | — |
| | phosphorus | 25 | 92 | 33 | 100 |
| | antimony | — | — | — | 250 |
| | cobalt | — | — | — | 10 |
| | molar ratio of phosphorus atom to aluminum atom | 2.2 | 4.0 | 1.0 | — |

Examples 1 to 17 and Comparative Examples 1 to 5

Each of the resulting polyester resin was dried in vacuo at 60° C. for 48 hours. Then, it was poured into an extruder. The resin was melted at 250° C., extruded from a T die, and wound around a rotating metal roll wherein a surface temperature was cooled down to 30° C. so as to quickly cool whereupon a non-stretched film having a thickness of 190 μm was prepared. A pulling-out speed (a rotating speed of the metal roll) of the non-stretched film at that time was about 25 m/min. The pulling-out speed is remarkably high compared with the value in the Examples of the Patent Document 5 (about 20 m/min). The resulting non-stretched film was guided into a tenter, and preheated so that a surface temperature of the film became 90° C. After that, stretching to an extent of 5 times in a widthwise direction was done together with cooling so that the film surface temperature became 73° C. Then, relaxing to an extent of 5% in the widthwise direction thereof was done together with heating so that the film surface temperature became 74° C. After that, the film was cooled and both ends thereof were cut and removed so that a width of film became 500 mm, followed by winding up in a roll whereupon a uniaxially stretched film having a thickness of about 40 μm was continuously prepared in a predetermined length. Characteristics of the resulting film were evaluated according to the above-mentioned methods.

Table 2 shows compositions of the resins, physical properties of the resins, recycling evaluations, recycling property, and film properties of Examples 1 to 17 and Comparative Examples 1 to 5.

TABLE 2

| | Items | Example 1 | Example 2 | Example 3 |
|---|---|---|---|---|
| | Raw material resin | Raw material resin 1 | Raw material resin 2 | Raw material resin 3 |
| Compositions of resins (mol %) | terephthalic acid | 100 | 100 | 100 |
| | ethylene glycol | 70 | 70 | 70 |
| | neopentyl glycol | 22 | 22 | 22 |
| | diethylene glycol | 8 | 8 | 8 |
| Physical properties of resins | intrinsic viscosity (IV) (dl/g) | 0.69 | 0.67 | 0.66 |
| | carboxyl end group concentration (AV) (eq/t) | 11 | 13 | 14 |
| | color b value | 2.3 | 2.2 | 2.2 |
| | Tg (° C.) | 72 | 72 | 72 |
| Amount of remaining metal (ppm) | aluminum | 30 | 30 | 30 |
| | phosphorus | 77 | 77 | 77 |
| | antimony | — | — | — |
| | cobalt | — | — | — |
| | molar ratio of phosphorus atom to aluminum atom | 2.2 | 2.2 | 2.2 |
| Recycling evaluation (LPM extrusion) | intrinsic viscosity (IV) (dl/g) | 0.64 | 0.62 | 0.61 |
| | ΔIV (dl/g) | −0.05 | −0.05 | −0.05 |
| | carboxyl end group concentration (AV) (eq/t) | 15 | 17 | 18 |
| | Δ AV (eq/t) | 4 | 4 | 4 |
| | color b value | 3.3 | 3.2 | 3.4 |
| | Δ (color b value) | 1.0 | 1.0 | 1.2 |
| Recycling property | resin IV: 0.60 dl/g or more | ○ | ○ | ○ |
| | AV: 40 eq/t or less | ○ | ○ | ○ |
| | color b value: 15.0 or less | ○ | ○ | ○ |
| | Film-preparation property | ○ | ○ | ○ |
| | Film IV (dl/g) | 0.65 | 0.63 | 0.62 |
| Heat-shrinking rate before aging (%) | 70° C. lengthwise direction | −3 | −3 | −4 |
| | 70° C. widthwise direction | 32 | 33 | 34 |
| | 98° C. lengthwise direction | 1 | 1 | 1 |
| | 98° C. widthwise direction | 72 | 71 | 72 |
| Heat-shrinking rate after aging (%) | 70° C. lengthwise direction | −3 | −3 | −4 |
| | 70° C. widthwise direction | 31 | 32 | 33 |
| | 98° C. lengthwise direction | 1 | 1 | 1 |
| | 98° C. widthwise direction | 72 | 71 | 71 |
| Difference in heat-shrinking rates before and after aging (%) | 70° C. lengthwise direction | 0 | 0 | 0 |
| | 70° C. widthwise direction | 1 | 1 | 1 |
| | 98° C. lengthwise direction | 0 | 0 | 0 |
| | 98° C. widthwise direction | 0 | 0 | 1 |
| | Natural shrinking rate after aging (%) | 0.2 | 0.3 | 0.4 |
| | Tensile elongation at break after aging (%) | 55 | 53 | 52 |
| | Shrinking stress (MPa) | 4.5 | 4.3 | 4.2 |

| | Items | Example 4 | Example 5 | Example 6 |
|---|---|---|---|---|
| | Raw material resin | Raw material resin 4 | Raw material resin 5 | Raw material resin 6 |
| Compositions of resins (mol %) | terephthalic acid | 100 | 100 | 100 |
| | ethylene glycol | 70 | 70 | 70 |
| | neopentyl glycol | 22 | 22 | 22 |
| | diethylene glycol | 8 | 8 | 8 |
| Physical properties of resins | intrinsic viscosity (IV) (dl/g) | 0.69 | 0.69 | 0.69 |
| | carboxyl end group concentration (AV) (eq/t) | 11 | 11 | 9 |
| | color b value | 2.4 | 2.1 | 2.7 |
| | Tg (° C.) | 72 | 72 | 72 |
| Amount of remaining metal (ppm) | aluminum | 30 | 30 | 35 |
| | phosphorus | 87 | 65 | 90 |
| | antimony | — | — | — |
| | cobalt | — | — | — |
| | molar ratio of phosphorus atom to aluminum atom | 2.5 | 1.9 | 2.2 |
| Recycling evaluation (LPM extrusion) | intrinsic viscosity (IV) (dl/g) | 0.65 | 0.64 | 0.65 |
| | Δ IV (dl/g) | −0.04 | −0.05 | −0.04 |
| | carboxyl end group concentration (AV) (eq/t) | 15 | 15 | 14 |
| | Δ AV (eq/t) | 4 | 4 | 5 |
| | color b value | 3.5 | 3.3 | 3.8 |
| | Δ (color b value) | 1.1 | 1.2 | 1.1 |

TABLE 2-continued

| | | | | |
|---|---|---|---|---|
| Recycling property | resin IV: 0.60 dl/g or more | ○ | ○ | ○ |
| | AV: 40 eq/t or less | ○ | ○ | ○ |
| | color b value: 15.0 or less | ○ | ○ | ○ |
| | Film-preparation property | ○ | ○ | ○ |
| | Film IV (dl/g) | 0.65 | 0.65 | 0.65 |
| Heat-shrinking rate before aging (%) | 70° C. lengthwise direction | −3 | −3 | −3 |
| | 70° C. widthwise direction | 33 | 33 | 33 |
| | 98° C. lengthwise direction | 1 | 2 | 2 |
| | 98° C. widthwise direction | 72 | 72 | 72 |
| Heat-shrinking rate after aging (%) | 70° C. lengthwise direction | −3 | −3 | −3 |
| | 70° C. widthwise direction | 31 | 32 | 32 |
| | 98° C. lengthwise direction | 1 | 2 | 2 |
| | 98° C. widthwise direction | 72 | 72 | 72 |
| Difference in heat-shrinking rates before and after aging (%) | 70° C. lengthwise direction | 0 | 0 | 0 |
| | 70° C. widthwise direction | 2 | 1 | 1 |
| | 98° C. lengthwise direction | 0 | 0 | 0 |
| | 98° C. widthwise direction | 0 | 0 | 0 |
| | Natural shrinking rate after aging (%) | 0.2 | 0.2 | 0.2 |
| | Tensile elongation at break after aging (%) | 54 | 55 | 55 |
| | Shrinking stress (MPa) | 4.5 | 4.4 | 4.5 |

| | Items | Example 7 | Example 8 | Example 9 |
|---|---|---|---|---|
| | Raw material resin | Raw material resin 7 | Raw material resin 8 | Raw material resin 9 |
| Compositions of resins (mol %) | terephthalic acid | 100 | 100 | 100 |
| | ethylene glycol | 70 | 70 | 70 |
| | neopentyl glycol | 22 | 22 | 22 |
| | diethylene glycol | 8 | 8 | 8 |
| Physical properties of resins | intrinsic viscosity (IV) (dl/g) | 0.67 | 0.66 | 0.69 |
| | carboxyl end group concentration (AV) (eq/t) | 12 | 13 | 9 |
| | color b value | 2.5 | 2.3 | 2.6 |
| | Tg (° C.) | 72 | 72 | 72 |
| Amount of remaining metal (ppm) | aluminum | 35 | 35 | 35 |
| | phosphorus | 90 | 90 | 100 |
| | antimony | — | — | — |
| | cobalt | — | — | — |
| | molar ratio of phosphorus atom to aluminum atom | 2.2 | 2.2 | 2.5 |
| Recycling evaluation (LPM extrusion) | intrinsic viscosity (IV) (dl/g) | 0.63 | 0.62 | 0.65 |
| | Δ IV (dl/g) | −0.04 | −0.04 | −0.04 |
| | carboxyl end group concentration (AV) (eq/t) | 16 | 18 | 13 |
| | Δ AV (eq/t) | 4 | 5 | 4 |
| | color b value | 3.8 | 3.5 | 3.6 |
| | Δ (color b value) | 1.3 | 1.2 | 1.0 |
| Recycling property | resin IV: 0.60 dl/g or more | ○ | ○ | ○ |
| | AV: 40 eq/t or less | ○ | ○ | ○ |
| | color b value: 15.0 or less | ○ | ○ | ○ |
| | Film-preparation property | ○ | ○ | ○ |
| | Film IV (dl/g) | 0.63 | 0.62 | 0.65 |
| Heat-shrinking rate before aging (%) | 70° C. lengthwise direction | −3 | −4 | −3 |
| | 70° C. widthwise direction | 33 | 34 | 33 |
| | 98° C. lengthwise direction | 1 | 1 | 1 |
| | 98° C. widthwise direction | 72 | 72 | 72 |
| Heat-shrinking rate after aging (%) | 70° C. lengthwise direction | −3 | −4 | −3 |
| | 70° C. widthwise direction | 32 | 33 | 32 |
| | 98° C. lengthwise direction | 1 | 1 | 1 |
| | 98° C. widthwise direction | 72 | 72 | 72 |
| Difference in heat-shrinking rates before and after aging (%) | 70° C. lengthwise direction | 0 | 0 | 0 |
| | 70° C. widthwise direction | 1 | 1 | 1 |
| | 98° C. lengthwise direction | 0 | 0 | 0 |
| | 98° C. widthwise direction | 0 | 0 | 0 |
| | Natural shrinking rate after aging (%) | 0.2 | 0.4 | 0.2 |
| | Tensile elongation at break after aging (%) | 53 | 52 | 54 |
| | Shrinking stress (MPa) | 4.3 | 4.2 | 4.5 |

| | Items | Example 10 | Example 11 | Example 12 |
|---|---|---|---|---|
| | Raw material resin | Raw material resin 10 | Raw material resin 11 | Raw material resin 12 |
| Compositions of resins (mol %) | terephthalic acid | 100 | 100 | 100 |
| | ethylene glycol | 70 | 70 | 70 |
| | neopentyl glycol | 22 | 22 | 22 |
| | diethylene glycol | 8 | 8 | 8 |

TABLE 2-continued

|  |  |  |  |  |
|---|---|---|---|---|
| Physical properties of resins | intrinsic viscosity (IV) (dl/g) | 0.69 | 0.69 | 0.67 |
|  | carboxyl end group concentration (AV) (eq/t) | 9 | 13 | 15 |
|  | color b value | 2.4 | 2.2 | 2.1 |
|  | Tg (° C.) | 72 | 72 | 72 |
| Amount of remaining metal (ppm) | aluminum | 35 | 20 | 20 |
|  | phosphorus | 78 | 50 | 50 |
|  | antimony | — | — | — |
|  | cobalt | — | — | — |
|  | molar ratio of phosphorus atom to aluminum atom | 1.9 | 2.2 | 2.2 |
| Recycling evaluation (LPM extrusion) | intrinsic viscosity (IV) (dl/g) | 0.65 | 0.64 | 0.61 |
|  | Δ IV (dl/g) | −0.04 | −0.05 | −0.06 |
|  | carboxyl end group concentration (AV) (eq/t) | 14 | 17 | 19 |
|  | Δ AV (eq/t) | 5 | 4 | 4 |
|  | color b value | 3.4 | 3.4 | 3.3 |
|  | Δ (color b value) | 1.0 | 1.2 | 1.2 |
| Recycling property | resin IV: 0.60 dl/g or more | ○ | ○ | ○ |
|  | AV: 40 eq/t or less | ○ | ○ | ○ |
|  | color b value: 15.0 or less | ○ | ○ | ○ |
|  | Film-preparation property | ○ | ○ | ○ |
|  | Film IV (dl/g) | 0.65 | 0.64 | 0.62 |
| Heat-shrinking rate before aging (%) | 70° C. lengthwise direction | −3 | −3 | −4 |
|  | 70° C. widthwise direction | 33 | 33 | 34 |
|  | 98° C. lengthwise direction | 2 | 1 | 1 |
|  | 98° C. widthwise direction | 73 | 72 | 72 |
| Heat-shrinking rate after aging (%) | 70° C. lengthwise direction | −3 | −3 | −4 |
|  | 70° C. widthwise direction | 32 | 32 | 33 |
|  | 98° C. lengthwise direction | 2 | 1 | 1 |
|  | 98° C. widthwise direction | 73 | 72 | 72 |
| Difference in heat-shrinking rates before and after aging (%) | 70° C. lengthwise direction | 0 | 0 | 0 |
|  | 70° C. widthwise direction | 1 | 1 | 1 |
|  | 98° C. lengthwise direction | 0 | 0 | 0 |
|  | 98° C. widthwise direction | 0 | 0 | 0 |
|  | Natural shrinking rate after aging (%) | 0.2 | 0.3 | 0.4 |
|  | Tensile elongation at break after aging (%) | 55 | 55 | 53 |
|  | Shrinking stress (MPa) | 4.4 | 4.5 | 4.3 |

|  | Items | Example 13 | Example 14 | Example 15 |
|---|---|---|---|---|
|  | Raw material resin | Raw material resin 13 | Raw material resin 14 | Raw material resin 15 |
| Compositions of resins (mol %) | terephthalic acid | 100 | 100 | 100 |
|  | ethylene glycol | 70 | 70 | 70 |
|  | neopentyl glycol | 22 | 22 | 22 |
|  | diethylene glycol | 8 | 8 | 8 |
| Physical properties of resins | intrinsic viscosity (IV) (dl/g) | 0.66 | 0.69 | 0.69 |
|  | carboxyl end group concentration (AV) (eq/t) | 16 | 13 | 13 |
|  | color b value | 2.3 | 2.3 | 2.4 |
|  | Tg (° C.) | 72 | 72 | 72 |
| Amount of remaining metal (ppm) | aluminum | 20 | 20 | 20 |
|  | phosphorus | 50 | 58 | 44 |
|  | antimony | — | — | — |
|  | cobalt | — | — | — |
|  | molar ratio of phosphorus atom to aluminum atom | 2.2 | 2.5 | 1.9 |
| Recycling evaluation (LPM extrusion) | intrinsic viscosity (IV) (dl/g) | 0.60 | 0.65 | 0.63 |
|  | Δ IV (dl/g) | −0.06 | −0.04 | −0.06 |
|  | carboxyl endgroup concentration (AV) (eq/t) | 20 | 18 | 18 |
|  | Δ AV (eq/t) | 4 | 5 | 5 |
|  | color b value | 3.5 | 3.5 | 3.7 |
|  | Δ (color b value) | 1.2 | 1.2 | 1.3 |
| Recycling property | resin IV: 0.60 dl/g or more | ○ | ○ | ○ |
|  | AV: 40 eq/t or less | ○ | ○ | ○ |
|  | color b value: 15.0 or less | ○ | ○ | ○ |
|  | Film-preparation property | ○ | ○ | ○ |
|  | Film IV (dl/g) | 0.61 | 0.64 | 0.64 |
| Heat-shrinking rate before aging (%) | 70° C. lengthwise direction | −3 | −3 | −3 |
|  | 70° C. widthwise direction | 35 | 33 | 33 |
|  | 98° C. lengthwise direction | 1 | 1 | 1 |
|  | 98° C. widthwise direction | 72 | 72 | 72 |
| Heat-shrinking rate after aging (%) | 70° C. lengthwise direction | −2 | −3 | −3 |
|  | 70° C. widthwise direction | 34 | 32 | 32 |
|  | 98° C. lengthwise direction | 1 | 1 | 1 |
|  | 98° C. widthwise direction | 72 | 72 | 72 |

TABLE 2-continued

| | | | | |
|---|---|---|---|---|
| Difference in heat-shrinking rates before and after aging (%) | 70° C. lengthwise direction | −1 | 0 | 0 |
| | 70° C. widthwise direction | 1 | 1 | 1 |
| | 98° C. lengthwise direction | 0 | 0 | 0 |
| | 98° C. widthwise direction | 0 | 0 | 0 |
| Natural shrinking rate after aging (%) | | 0.4 | 0.4 | 0.2 |
| Tensile elongation at break after aging (%) | | 52 | 54 | 55 |
| Shrinking stress (MPa) | | 4.2 | 4.5 | 4.4 |

| | Items | Example 16 | Example 17 | Comparative Example 1 |
|---|---|---|---|---|
| | Raw material resin | Raw material resin 16 | Raw material resin 17 | Raw material resin 18 |
| Compositions of resins (mol %) | terephthalic acid | 100 | 100 | 100 |
| | ethylene glycol | 63 | 65 | 70 |
| | neopentyl glycol | 30 | 20 | 22 |
| | diethylene glycol | 7 | 15 | 8 |
| Physical properties of resins | intrinsic viscosity (IV) (dl/g) | 0.69 | 0.69 | 0.69 |
| | carboxyl end group concentration (AV) (eq/t) | 11 | 11 | 8 |
| | color b value | 2.1 | 2.6 | 2.1 |
| | Tg (° C.) | 72 | 68 | 72 |
| Amount of remaining metal (ppm) | aluminum | 30 | 30 | 45 |
| | phosphorus | 77 | 77 | 115 |
| | antimony | — | — | — |
| | cobalt | — | — | — |
| | molar ratio of phosphorus atom to aluminum atom | 2.2 | 2.2 | 2.2 |
| Recycling evaluation (LPM extrusion) | intrinsic viscosity (IV) (dl/g) | 0.64 | 0.63 | 0.65 |
| | Δ IV (dl/g) | −0.05 | −0.06 | −0.04 |
| | carboxyl end group concentration (AV) (eq/t) | 15 | 15 | 13 |
| | Δ AV (eq/t) | 4 | 4 | 5 |
| | color b value | 3.3 | 4.1 | 3.1 |
| | Δ (color b value) | 1.2 | 1.5 | 1.0 |
| Recycling property | resin IV: 0.60 dl/g or more | ○ | ○ | ○ |
| | AV: 40 eq/t or less | ○ | ○ | ○ |
| | color b value: 15.0 or less | ○ | ○ | ○ |
| Film-preparation property | | ○ | ○ | Δ |
| Film IV (dl/g) | | 0.64 | 0.62 | 0.65 |
| Heat-shrinking rate before aging (%) | 70° C. lengthwise direction | −4 | −4 | −3 |
| | 70° C. widthwise direction | 36 | 34 | 33 |
| | 98° C. lengthwise direction | 1 | 1 | 1 |
| | 98° C. widthwise direction | 73 | 71 | 71 |
| Heat-shrinking rate after aging (%) | 70° C. lengthwise direction | −4 | −4 | −3 |
| | 70° C. widthwise direction | 34 | 33 | 32 |
| | 98° C. lengthwise direction | 1 | 1 | 1 |
| | 98° C. widthwise direction | 72 | 71 | 71 |
| Difference in heat-shrinking rates before and after aging (%) | 70° C. lengthwise direction | 0 | 0 | 0 |
| | 70° C. widthwise direction | 2 | 1 | 1 |
| | 98° C. lengthwise direction | 0 | 0 | 0 |
| | 98° C. widthwise direction | 0 | 0 | 0 |
| Natural shrinking rate after aging (%) | | 0.4 | 0.1 | 0.2 |
| Tensile elongation at break after aging (%) | | 48 | 85 | 54 |
| Shrinking stress (MPa) | | 3.8 | 3.0 | 4.5 |

| | Items | Comparative Example 2 | Comparative Example 3 | Comparative Example 4 |
|---|---|---|---|---|
| | Raw material resin | Raw material resin 19 | Raw material resin 20 | Raw material resin 21 |
| Compositions of resins (mol %) | terephthalic acid | 100 | 100 | 100 |
| | ethylene glycol | 70 | 70 | 70 |
| | neopentyl glycol | 22 | 22 | 22 |
| | diethylene glycol | 8 | 8 | 8 |
| Physical properties of resins | intrinsic viscosity (IV) (dl/g) | 0.63 | 0.63 | 0.69 |
| | carboxyl end group concentration (AV) (eq/t) | 20 | 19 | 10 |
| | color b value | 4.2 | 4.0 | 2.5 |
| | Tg (° C.) | 72 | 72 | 72 |
| Amount of remaining metal (ppm) | aluminum | 10 | 20 | 30 |
| | phosphorus | 25 | 92 | 33 |
| | antimony | — | — | — |
| | cobalt | — | — | — |
| | molar ratio of phosphorus atom to aluminum atom | 2.2 | 4.0 | 1.0 |
| Recycling evaluation | intrinsic viscosity (IV) (dl/g) | 0.57 | 0.58 | 0.61 |
| | Δ IV (dl/g) | −0.06 | −0.05 | −0.08 |

TABLE 2-continued

| | | | | |
|---|---|---|---|---|
| (LPM extrusion) | carboxyl end group concentration (AV) (eq/t) | 26 | 25 | 16 |
| | Δ AV (eq/t) | 6 | 6 | 6 |
| | color b value | 5.8 | 5.5 | 3.8 |
| | Δ (color b value) | 1.6 | 1.5 | 1.3 |
| Recycling property | resin IV: 0.60 dl/g or more | x | x | ○ |
| | AV: 40 eq/t or less | ○ | ○ | ○ |
| | color b value: 15.0 or less | ○ | ○ | ○ |
| | Film-preparation property | x | x | Δ |
| | Film IV (dl/g) | 0.59 | 0.59 | 0.61 |
| Heat-shrinking rate before aging (%) | 70° C. lengthwise direction | −3 | −3 | −3 |
| | 70° C. widthwise direction | 33 | 33 | 33 |
| | 98° C. lengthwise direction | 1 | 1 | 1 |
| | 98° C. widthwise direction | 72 | 72 | 72 |
| Heat-shrinking rate after aging (%) | 70° C. lengthwise direction | −3 | −3 | −3 |
| | 70° C. widthwise direction | 31 | 31 | 32 |
| | 98° C. lengthwise direction | 1 | 1 | 1 |
| | 98° C. widthwise direction | 72 | 72 | 72 |
| Difference in heat-shrinking rates before and after aging (%) | 70° C. lengthwise direction | 0 | 0 | 0 |
| | 70° C. widthwise direction | 2 | 2 | 1 |
| | 98° C. lengthwise direction | 0 | 0 | 0 |
| | 98° C. widthwise direction | 0 | 0 | 0 |
| | Natural shrinking rate after aging (%) | 0.2 | 0.2 | 0.2 |
| | Tensile elongation at break after aging (%) | 16 | 15 | 52 |
| | Shrinking stress (MPa) | 4.4 | 4.4 | 4.4 |

| | Items | Comparative Example 5 |
|---|---|---|
| | Raw material resin | Raw material resin 22 |
| Compositions of resins (mol %) | terephthalic acid | 100 |
| | ethylene glycol | 65 |
| | neopentyl glycol | 25 |
| | diethylene glycol | 10 |
| Physical properties of resins | intrinsic viscosity (IV) (dl/g) | 0.65 |
| | carboxyl end group concentration (AV) (eq/t) | 17 |
| | color b value | 5.9 |
| | Tg (° C.) | 70 |
| Amount of remaining metal (ppm) | aluminum | — |
| | phosphorus | 100 |
| | antimony | 250 |
| | cobalt | 10 |
| | molar ratio of phosphorus atom to aluminum atom | — |
| Recycling evaluation (LPM extrusion) | intrinsic viscosity (IV) (dl/g) | 0.57 |
| | Δ IV (dl/g) | −0.08 |
| | carboxyl end group concentration (AV) (eq/t) | 26 |
| | Δ AV (eq/t) | 9 |
| | color b value | 7.4 |
| | Δ (color b value) | 1.5 |
| Recycling property | resin IV: 0.60 dl/g or more | x |
| | AV: 40 eq/t or less | ○ |
| | color b value: 15.0 or less | ○ |
| | Film-preparation property | x |
| | Film IV (dl/g) | 0.58 |
| Heat-shrinking rate before aging (%) | 70° C. lengthwise direction | −4 |
| | 70° C. widthwise direction | 30 |
| | 98° C. lengthwise direction | 1 |
| | 98° C. widthwise direction | 70 |
| Heat-shrinking rate after aging (%) | 70° C. lengthwise direction | −4 |
| | 70° C. widthwise direction | 27 |
| | 98° C. lengthwise direction | 1 |
| | 98° C. widthwise direction | 70 |
| Difference in heat-shrinking rates before and after aging (%) | 70° C. lengthwise direction | 0 |
| | 70° C. widthwise direction | 3 |
| | 98° C. lengthwise direction | 0 |
| | 98° C. widthwise direction | 0 |
| | Natural shrinking rate after aging (%) | 0.4 |
| | Tensile elongation at break after aging (%) | 15 |
| | Shrinking stress (MPa) | 4.0 |

As will be noted from Table 2, in the polyester resins of Examples 1 to 17, the film-preparation property and the film strength (tensile elongation at break after aging) are excellent in spite of the fact that the film-preparation speed is higher than the prior art. Moreover, the recycling property and various properties upon film preparation are very good. On the contrary, in the polyester resin of Comparative Example 1, the content of the aluminum atom in the resin is too much whereby foreign matters caused by aluminum is abundant. Those foreign matters are caught by a filter in the extruder whereby the filter is clogged and the back pressure upon resin extrusion increases and reaches the realizable upper limit of the back pressure. Therefore, the film-preparation speed needs to be lowered during the film preparation whereby the film-preparation property is inferior. In Comparative Example 2, the content of the aluminum atom in the resin is too small in spite of the fact that the molar ratio of the phosphorus atom to the aluminum atom is within the range of the present invention whereby the content of phosphorus atom in the resin is also too small. Accordingly, the stability of the resin against heat and thermal oxidation by the residual phosphorus compound is not well exhibited. Moreover, the intrinsic viscosity of the resin is too small whereby the resin is deteriorated during the film preparation, and the intrinsic viscosity of the film is greatly lowered. As a result, drawdown is generated upon the film preparation and film preparation is difficult and the film strength is inferior too. In Comparative Example 3, the molar ratio of the phosphorus atom to the aluminum atom is too high. As a result, the catalytic activity is inferior, and the resin having high intrinsic viscosity cannot be obtained in spite of the long reaction time for the polycondensation reaction as shown in Table 1. Further, the intrinsic viscosity of the resin is too small as shown in Table 2, whereby the resin is deteriorated during the film preparation, and the intrinsic viscosity of the film is greatly lowered. As a result, drawdown is generated upon the film preparation and film preparation is difficult and the film strength is inferior too. In the polyester resin of Comparative Example 4, the molar ratio of the phosphorus atom to the aluminum atom is too small whereby foreign matters caused by aluminum is abundant, similar to Comparative Example 1. Those foreign matters are caught by a filter in the extruder whereby the filter is clogged and the back pressure upon resin extrusion increases and reaches the realizable upper limit of the back pressure. Therefore, the film-preparation speed needs to be lowered during the film preparation whereby the film-preparation property is inferior. Moreover, the molar ratio of the phosphorus atom to the aluminum atom is too small, whereby the stability of the resin against heat and thermal oxidation lowers and the intrinsic viscosity of the film also lowers. In Comparative Example 5, the antimony compound is used as the polymerization catalyst instead of the combination of the aluminum compound and the phosphorus compound, whereby the stability of the resin against heat and thermal oxidation is inferior. Moreover, the resin is deteriorated during the film preparation, and the intrinsic viscosity of the film is greatly lowered. As a result, drawdown is generated upon the film preparation and film preparation is difficult and the film strength is inferior too.

INDUSTRIAL APPLICABILITY

According to the polyester resin of the present invention, the film-production cost can be reduced while ensuring the film-preparation property and the film strength. In the heat-shrinkable film using the polyester resin of the present invention, a decrease in the heat-shrinking rate after the aging is small and the tensile elongation at break in the non-shrinking direction after the aging is high, in spite of the fact of having the high heat-shrinking rate. Accordingly, it can be advantageously used as a label. The packaged product such as a container wherein the heat-shrinkable polyester-based film of the present invention is used as a label exhibits a beautiful appearance. Also, in the polyester resin of the present invention, it is possible to suppress the deterioration of physical properties upon the film preparation of a heat-shrinkable film. Moreover, it is possible to recycle a film which was once made into a waste at a high rate.

The invention claimed is:

1. A polyester resin for heat-shrinkable film which contains terephthalic acid as a main component of a dicarboxylic acid component, contains ethylene glycol as a main component of a diol component, and contains from 18 to 32% by mole of neopentyl glycol and from 8 to 15% by mole of diethylene glycol when a total amount of the whole diol component in total polyester resin components is taken as 100% by mole, characterized in that the polyester resin satisfies the following requirements (i) to (iv):
   (i) the polyester resin has an intrinsic viscosity (IV) of not less than 0.65 and less than 0.70 dL/g;
   (ii) the polyester resin has a carboxyl end group concentration (AV) of from 8 to 25 eq/t;
   (iii) the polyester resin has a color b value of from 1.0 to 8.0 in an L*a*b* color system; and
   (iv) the polyester resin contains aluminum atom and phosphorus atom, wherein an amount of the aluminum atom in the polyester resin is 15 to 40 ppm and wherein a molar ratio of the phosphorus atom to the aluminum atom in the polyester resin is 1.8 to 2.6.

2. A heat-shrinkable film comprising the polyester resin for heat-shrinkable film of claim 1.

3. A heat-shrinkable label comprising the heat-shrinkable film of claim 2.

4. A packaged product which has been formed by coating the heat-shrinkable label of claim 3 at least on a part of an outer periphery of a target to be packaged followed by a heat-shrinking treatment.

* * * * *